US006896939B2

(12) United States Patent
Klasen-Memmer et al.

(10) Patent No.: US 6,896,939 B2
(45) Date of Patent: May 24, 2005

(54) LIQUID-CRYSTAL MEDIUM, AND ELECTRO-OPTICAL DISPLAY CONTAINING SAME

(75) Inventors: Melanie Klasen-Memmer, Heuchelheim (DE); Matthias Bremer, Darmstadt (DE); Malgorzata Rillich, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 17 days.

(21) Appl. No.: 10/412,590

(22) Filed: Apr. 14, 2003

(65) Prior Publication Data

US 2003/0222245 A1 Dec. 4, 2003

(30) Foreign Application Priority Data

Apr. 12, 2002 (DE) .......................... 102 16 197

(51) Int. Cl.[7] .................. C09K 19/12; C09K 19/30; C09K 19/34; C09K 19/20
(52) U.S. Cl. .............. 428/1.1; 252/299.66; 252/299.61; 252/299.63; 252/299.67
(58) Field of Search ...................... 428/1.1; 252/299.66, 252/299.63, 299.61, 299.67, 299.62

(56) References Cited

U.S. PATENT DOCUMENTS

| 5,384,065 A | * | 1/1995 | Geelhaar et al. | ........ 252/299.63 |
| 5,599,480 A | * | 2/1997 | Tarumi et al. | ......... 252/299.63 |
| 5,965,060 A | * | 10/1999 | Tarumi et al. | ......... 252/299.63 |
| 6,066,268 A | * | 5/2000 | Ichinose et al. | ....... 252/299.63 |
| 6,217,953 B1 | * | 4/2001 | Heckmeier et al. | .......... 428/1.1 |
| 6,248,410 B1 | * | 6/2001 | Ichinose et al. | ............. 428/1.1 |
| 6,638,581 B2 | * | 10/2003 | Heckmeier et al. | .......... 428/1.1 |
| 6,740,369 B2 | * | 5/2004 | Klasen-Memmer et al. | . 428/1.1 |

FOREIGN PATENT DOCUMENTS

| EP | 1 146 104 A2 | 10/2001 |
| GB | 2 300 642 A | 11/1996 |

* cited by examiner

Primary Examiner—Shean C. Wu
(74) Attorney, Agent, or Firm—Millen, White, Zelano & Branigan, P.C.

(57) ABSTRACT

A nematic liquid-crystal media which comprises
  a) a dielectrically negative liquid-crystalline component A comprising one or more compounds of the formula I

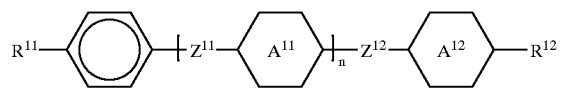

in which the parameters are as defined in the text, and
  b) a further dielectrically negative liquid-crystalline component B, and optionally
  c) a dielectrically neutral liquid-crystalline component C, and optionally
  d) a dielectrically positive liquid-crystalline component D,
wherein said media is used in liquid-crystal displays.

35 Claims, No Drawings

LIQUID-CRYSTAL MEDIUM, AND ELECTRO-OPTICAL DISPLAY CONTAINING SAME

The present invention relates to liquid-crystal displays, particularly active matrix addressed liquid-crystal displays (AMDs or AMLCDs), especially those which use an active matrix comprising thin film transistors (TFTs) or varistors. In addition, the present application relates to liquid-crystal media for use in displays of this type. AMDs of this type are able to use various active electronic switching elements. The most widespread are displays which use three-pole switching elements. These are also preferred in the present invention. Examples of three-pole switching elements of this type are MOS (metal oxide silicon) transistors or the above-mentioned TFTs or varistors. In the TFTs, various semiconductor materials, predominantly silicon or alternatively cadmium selenide, are used. In particular, polycrystalline silicon or amorphous silicon is used. In contrast to the three-pole electronic switching elements, matrixes of 2-pole switching elements, such as, for example, MIM (metal insulator metal) diodes, ring diodes or "back to back" diodes, can also be employed in AMDs. However, as also explained in greater detail below, these are generally not preferred owing to the worse electro-optical properties achieved by the AMDs.

The liquid crystals used as dielectrics in liquid-crystal displays of this type are those whose optical properties change reversibly on application of an electric voltage. Electro-optical displays which use liquid-crystals as media are known to the person skilled in the art. These liquid-crystal displays use various electro-optical effects.

The most widespread conventional displays use the TN effect (twisted nematic, having a nematic structure which is twisted by about 90°), the STN effect (supertwisted nematic) or the SBE effect (supertwisted birefringence effect). In these and similar electro-optical effects, liquid-crystalline media of positive dielectric anisotropy ($\Delta\epsilon$) are used.

Since the operating voltage in displays in general, i.e. including in displays using these effects, should be as low as possible, use is made of liquid-crystal media of large dielectric anisotropy, which are generally composed predominantly of dielectrically positive liquid-crystal compounds and at most comprise relatively small/low proportions of dielectrically neutral compounds.

In contrast to the said conventional displays utilising the said electro-optical effects which require liquid-crystal media of positive dielectric anisotropy, there are other electro-optical effects which use liquid-crystal media of negative dielectric anisotropy, such as, for example, the ECB effect (electrically controlled birefringence) and its sub-forms DAP (deformation of aligned phases), VAN (vertically aligned nematics) and CSH (colour super homeotropics). These are the subject-matter of the present application.

The IPS (in plane switching) effect, which has been employed to an increased extent recently, can use both dielectrically positive and dielectrically negative liquid-crystal media, similarly to "guest/host" displays, which can employ dyes either in dielectrically positive or in dielectrically negative media, depending on the display mode used. In the case of the liquid-crystal displays mentioned in this paragraph, those which use dielectrically negative liquid-crystal media are also the subject-matter of the present application.

A further highly promising type of liquid-crystal display are so-called "axially symmetric microdomain" (abbreviated to ASM) displays, which are preferably addressed by means of plasma arrays (plasma addressed liquid crystal displays, or PA LCDs). These displays are also the subject-matter of the present application.

The liquid-crystal media employed in the above-mentioned liquid-crystal displays and all liquid-crystal displays which utilise similar effects generally consist predominantly and in most cases even very substantially of liquid-crystal compounds having the corresponding dielectric anisotropy, i.e. of compounds of positive dielectric anisotropy in the case of dielectrically positive media and of compounds of negative dielectric anisotropy in the case of dielectrically negative media.

In the media used in accordance with the present application, at most significant amounts of dielectrically neutral liquid-crystal compounds and in general only very small amounts or even no dielectrically positive compounds at all, are typically employed, since in general the liquid-crystal displays should have the lowest possible addressing voltages. For this reason, liquid-crystal compounds having the opposite sign of the dielectric anisotropy to the dielectric anisotropy of the medium are generally employed extremely sparingly or not at all.

The liquid-crystal media of the prior art have relatively low birefringence values, relatively high operating voltages (the threshold voltages ($V_0$) are often relatively high, in some cases greater than 2.2 V) and relatively long response times, which are often inadequate, in particular for video-capable displays. Furthermore, they are usually unsuitable for high operating temperatures and/or have inadequate low-temperature stabilities. Thus, the nematic phases often extend only down to −20° C. and in some cases even only down to −10° C.

For the most part, the liquid-crystal media of the prior art have relatively unfavourable values for $\Delta n$, which are often significantly smaller than 0.11 and in some cases are smaller than 0.10. However, such small $\Delta n$ values are not particularly advantageous for VAN displays, since they require the use of cells having relatively large layer thicknesses of 4 $\mu$m or more and thus result in response times which are unacceptably long for many applications. Thus, for example, a d·$\Delta n$ of approximately 0.30 $\mu$m is employed in the case of an untwisted director orientation or a d·$\Delta n$ of approximately 0.40 $\mu$m is employed with a 90° twist However, the use of cells having very small layer thicknesses frequently results in low production yields in the displays.

In most cases, the most favourable $\Delta n$ values of the liquid-crystal media used for fast-switching displays are in the range from 0.105 to 0.15. This also applies to IPS displays.

In addition, the response times of the prior-art displays are often too long. Thus, the viscosities of the liquid-crystal media must be improved, i.e. reduced. This applies in particular to the rotational viscosity and very particularly to the value thereof at low temperatures. A reduction in the flow viscosity generally results, in particular in the case of displays having a homeotropic edge alignment of the liquid crystals (for example in ECB and VAN displays), in a very desired shortening of the filling times during production of the displays.

For example, EP 1 146 104 discloses liquid-crystal media for VAN displays which comprise compounds of the formula

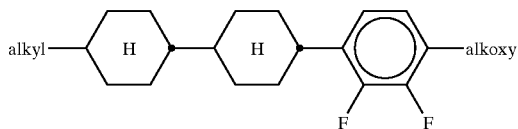

However, these media have relatively low values of the birefringence and at the same time relatively high values of the rotational viscosity. They thus lead to relatively long response times in the displays.

GB 2,300,642 discloses liquid-crystal media of negative dielectric anisotropy which comprise terphenyls which have polar terminal substituents. However, these media have only low absolute values of the dielectric anisotropy. And although they cover a broad range of birefringence values, they all have comparatively high viscosities, in particular high rotational viscosities, and thus result in disadvantageous response times.

Thus, there has been and continues to be a great demand for liquid-crystal media which do not have the disadvantages of the media from the prior art or at least do so to a significantly reduced extent.

Surprisingly, it has been found that this is achieved by the liquid-crystal media according to the invention. These media comprise a) a dielectrically negative, liquid-crystalline component (component A) which comprises one or more dielectrically negative compound(s) of the formula I

I

In which
- $R^{11}$ is alkyl having from 1 to 7 carbon atoms, preferably n-alkyl, particularly preferably n-alkyl having from 1 to 5 carbon atoms, alkoxy having from 1 to 7 carbon atoms, preferably n-alkoxy, particularly preferably n-alkoxy having from 1 to 5 carbon atoms, or alkoxyalkyl, alkenyl or alkenyloxy having from 2 to 7 carbon atoms, preferably having from 2 to 4 carbon atoms, preferably alkenyloxy,
- $R^{12}$ is alkyl or alkoxy having from 1 to 7 carbon atoms, preferably alkoxy, preferably n-alkoxy and particularly preferably n-alkoxy having from 2 to 5 carbon atoms, or alkoxyalkyl, alkenyl or alkenyloxy having from 2 to 7 carbon atoms, preferably having from 2 to 4 carbon atoms, preferably alkenyloxy,

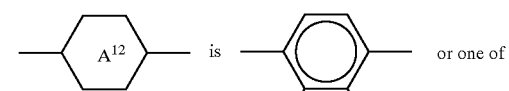

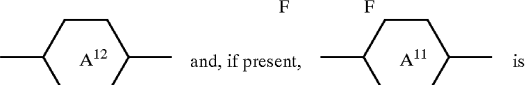

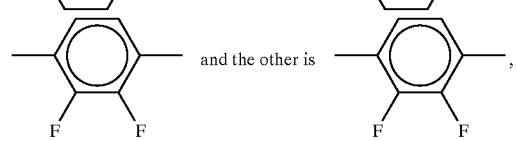

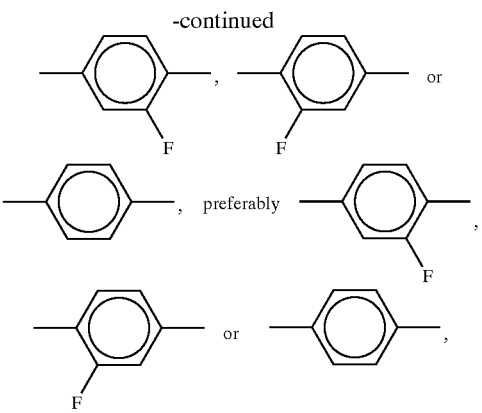

$Z^{11}$ and $Z^{12}$ are each, independently of one another, $-CH_2-CH_2-$, $-CH_2-CF_2-$, $-CF_2-CH_2-$, $-OCH_2-$, $-CH_2O-$, $-OCF_2-$, $-CF_2O-$ or a single bond, preferably at least one single bond and particularly preferably both a single bond, and n is 0 or 1, preferably 1 where one or more H atoms in the third phenyl ring may optionally be replaced by F atoms if

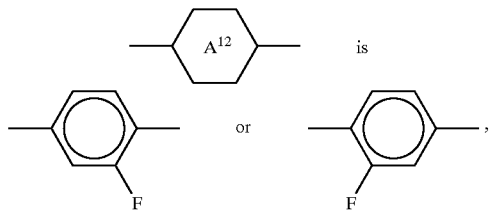

and b) a dielectrically negative liquid-crystalline component (component B), which preferably comprises one or more dielectrically negative compound(s) selected from the group consisting of the compounds of the formulae II and III

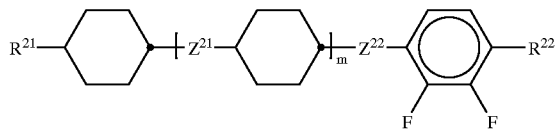

II in which
- $R^{21}$ is alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkoxyalkyl, alkenyl or alkenyloxy having from 2 to 7 carbon atoms, preferably having from 2 to 4 carbon atoms, preferably alkenyloxy,
- $R^{22}$ is alkyl having from 1 to 7 carbon atoms, preferably n-alkyl, particularly preferably n-alkyl having from 1 to 3 carbon atoms, alkoxy having from 1 to 7 carbon atoms, preferably n-alkoxy, particularly preferably n-alkoxy having from 2 to 5 carbon atoms, or alkoxyalkyl, alkenyl or alkenyloxy having from 2 to 7 carbon atoms, preferably alkenyloxy, preferably having from 2 to 4 carbon atoms, $Z^{21}$ and $Z^{22}$ are each, independently of one another, —$CH_2$—$CH_2$—, —$CH$=$CH$—, —$CF$=$CF$—, —$CF$=$CH$—, —$CH$=$CF$—, —$C$≡$C$—, —$COO$—, —$CF_2$—$CF_2$—, —$CF_2$—$CH_2$—, —$CH_2$—$CF_2$—, —$CH_2$—$O$—, —$O$—$CH_2$—, —$CF_2$—$O$—, —$O$—$CF_2$— or a single bond, preferably —$CH_2$—$CH_2$— or a single bond and particularly preferably a single bond, m is 0 or 1,

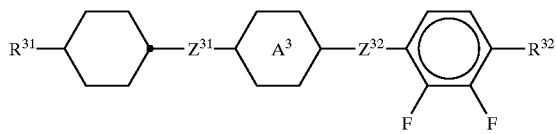
III $Z^{31}$ and $Z^{32}$ are, independently of each other, —$CH_2$—$CH_2$—, —$CH$=$CH$—, —$C$≡$C$—, —$COO$— or a single bond, preferably —$CH_2$—$CH_2$— or a single bond and particularly preferably a single bond, $R^{31}$ and $R^{32}$ are each, independently of one another, alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having 1–5, especially 2 to 5, carbon atoms, or alkenyloxy having 1–7, preferably 2 to 7, carbon atoms, preferably having from 2 to 4 carbon atoms, and

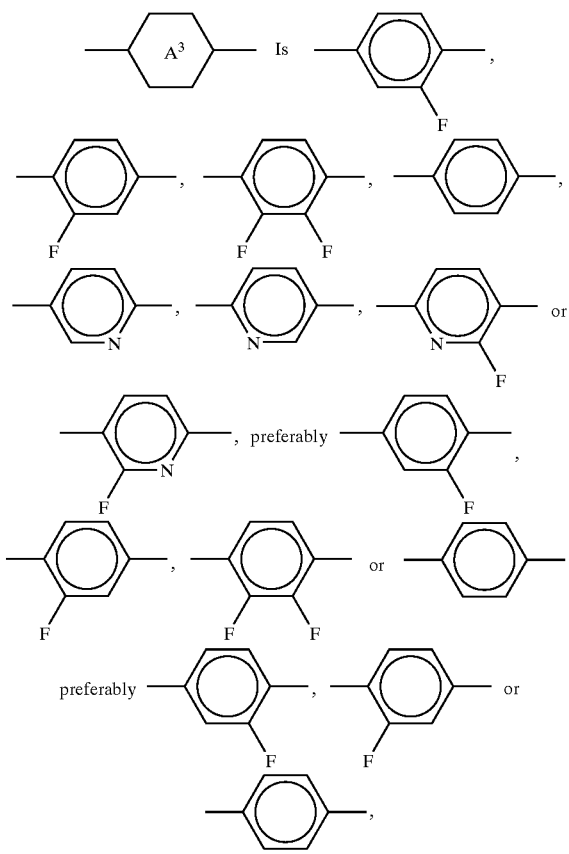

and $Z^{31}$ and $Z^{32}$ are each, independently of one another, —$CH_2$—$CH_2$—, —$CH$=$CH$—, —$CF$=$CF$—, —$CF$=$CH$—, —$CH$=$CF$—, —$C$≡$C$—, —$COO$—, —$CF_2$—$CF_2$—, —$CF_2$—$CH_2$—, —$CH_2$—$CF_2$—, —$CH_2$—$O$—, —$O$—$CH_2$—, —$CF_2$—$O$—, —$O$—$CF_2$— or a single bond, preferably —$CH_2$—$CH_2$— or a single bond and particularly preferably a single bond, and optionally c) a dielectrically neutral component (component C) which comprises one or more dielectrically neutral compound(s) of the formula IV

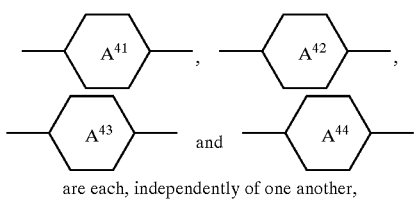
IV in which $R^{41}$ and $R^{42}$ are each, independently of one another, as defined above for $R^{21}$ under the formula II, $Z^{41}$, $Z^{42}$ and $Z^{43}$ are each, independently of one another, —$CH_2$—$CH_2$—, —$CH$=$CH$—, —$COO$— or a single bond,

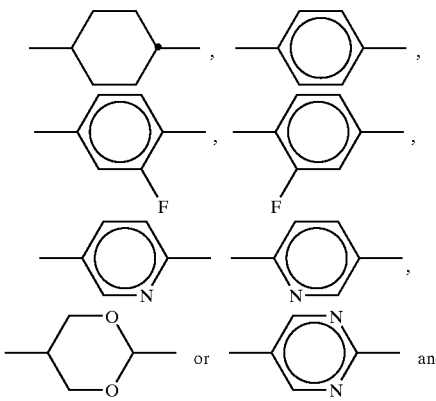

are each, independently of one another, o and p, are each, independently of one another, 0 or 1, but preferably $R^{41}$ and $R^{42}$ are each, independently of one another, alkyl or alkoxy having 1–5 carbon atoms or alkenyl having 2–5 carbon atoms,

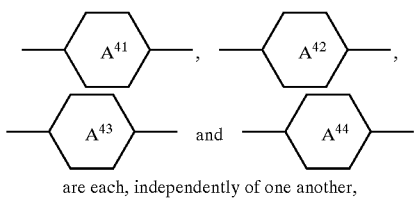

are each, independently of one another,

-continued

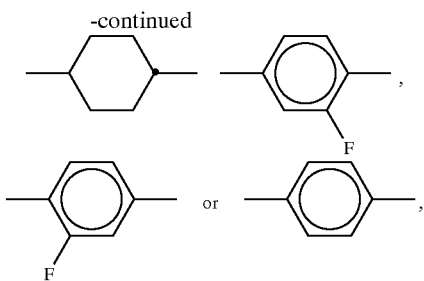

and very particularly preferably at least two of these rings are

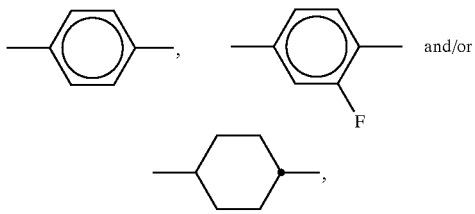

where two adjacent rings are very particularly preferably linked directly and are preferably

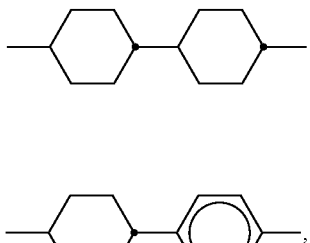

or and optionally d) one or more dielectric positive compound(s) (component D) of the formula V

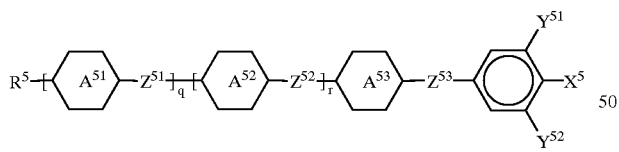
V in which

R$^5$ is alkyl or alkoxy having from 1 to 7 carbon atoms, or alkoxyalkyl, alkenyl or alkenyloxy having from 2 to 7 carbon atoms, Z$^{51}$, Z$^{52}$ and Z$^{53}$ are each, independently of one another, —CH$_2$—CH$_2$—, —CH=CH—, —C≡C—, —COO— or a single bond,

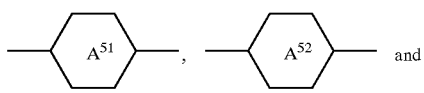

-continued are each, independently of one another,

X$^5$ is F, OCF$_2$H or OCF$_3$, and

Y$^{51}$ and Y$^{52}$ are each, independently of one another, H or F, Y$^{51}$ is preferably F and, in particular in the case where X$^5$=F or OCF$_2$H, Y$^{52}$ is preferably F, and q and r are each, independently of one another, 0 or 1.

In a further preferred embodiment, the medium comprises one or more dielectrically negative compounds of the formula VI

VI $R^{61}\!-\!\!\fbox{A$^{61}$}\!-\!\!\left[Z^{61}\!-\!\!\fbox{A$^{62}$}\right]_q\!\!\left[Z^{62}\!-\!\!\fbox{A$^{63}$}\right]_r\!\!-\!Z^{63}\!-\!\!\fbox{A$^{64}$}\!-\!R^{62}$ in which R$^{61}$ and R$^{62}$ are each, independently of one another, as defined above for R$^{21}$ under the formula II, Z$^{61}$, Z$^{62}$ and Z$^{63}$ are each, independently of one another, —CH$_2$—CH$_2$—, —CH=CH—, —COO— or a single bond, at least one of the

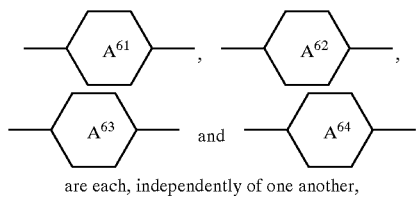

in which at least one of

L$^{61}$ and L$^{62}$ is N and the other is N or C–F, and the other are each, independently of one another, -continued

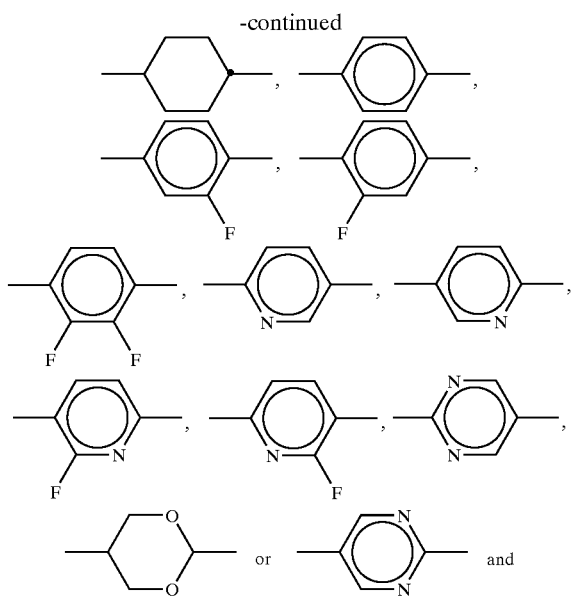

q and r are each, independently of one another, 0 or 1 but preferably $R^{61}$ and $R^{62}$ are each, independently of one another, alkyl or alkoxy having 1–5 carbon atoms or alkenyl having 2–5 carbon atoms,

—[A$^{61}$]—, —[A$^{62}$]—,

—[A$^{63}$]— and —[A$^{64}$]— apart from the at least one which is

—[⌬]—,
  L$^{61}$—L$^{62}$ are each, independently of one another, —[⬡]—,

—[⌬(F)]—, or —[⌬(F,F)]—, or —[⬡]—, and very particularly preferably at least two of these rings are —[⬡]—, —[⬡(F)]— and/or

—[⬡(F,F)]—,

—[⬡]—, $Z^{61}$, $Z^{62}$ and $Z^{63}$ are each, independently of one another, —CH$_2$—CH$_2$— or a single bond, preferably a single bond.

In a further preferred embodiment, the medium comprises one or more dielectrically negative compounds of the formula VII $$R^{71}-\!\!\boxed{A^{71}}\!\!-\![Z^{71}-\!\!\boxed{A^{72}}\!\!-]_s Z^{72}-\!\!\boxed{\phantom{X}}\!\!\genfrac{}{}{0pt}{}{X^7}{R^{72}}$$  VII in which $R^{71}$ and $R^{72}$ are alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkenyloxy having from 2 to 7 carbon atoms, preferably having from 2 to 4 carbon atoms, very particularly preferably both are n-alkoxy having from 1 to 5 carbon atoms, and $Z^{71}$ and $Z^{72}$ are each, independently of one another, —CH$_2$—CH$_2$—, —CH=CH—, —CF=CF—, —CF=CH—, —CH=CF—, —C≡C—, —COO—, —CF$_2$—CF$_2$—, —CF$_2$—CH$_2$—, —CH$_2$—CF$_2$—, —CH$_2$—O—, —O—CH$_2$—, —CF$_2$—O—, —O—CF$_2$— or a single bond, preferably —CH$_2$—CH$_2$— or a single bond and particularly preferably a single bond, $X^7$ is F, Cl, CN or NCS, preferably F or CN, particularly preferably CN.

—[A$^{71}$]— and —[A$^{72}$]— are each, independently of one another, —[⬡]—,

—[⬡]—, —[⬡(F)]—, —[⬡(F)]—,

—[⬡(F,F)]—, —[⬡N]—, —[⬡N]—,

—[⬡N(F)]—, —[⬡N(F)]—, —[⬡N,N]—,

—[⌬O,O]— or —[⬡N,N]—, preferably —[⬡]— or —[⬡]— and s is 0 or 1.

Component A preferably consists predominantly, particularly preferably consists essentially completely and very particularly preferably consists virtually completely, of one or more compounds of the formula I. These compounds of the formula I are preferably selected from the group consisting of the compounds of the formulae I-1 to I-5, particularly preferably from the group consisting of the formulae I-1 to I-3:

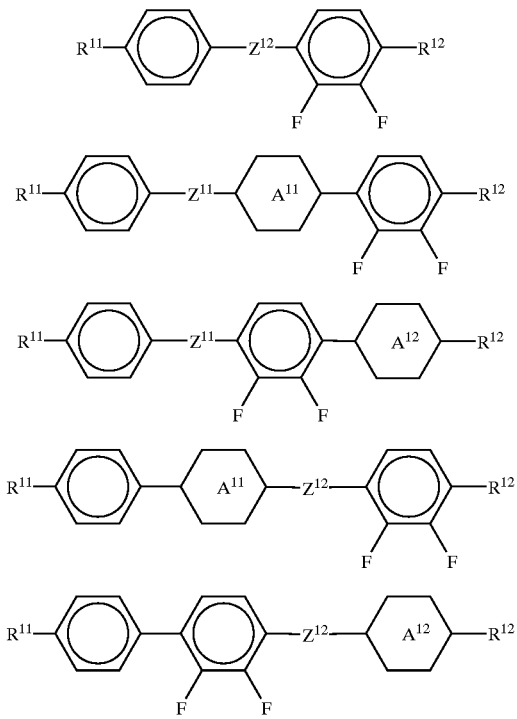

in which
$R^{11}$, $R^{12}$, $Z^{11}$, $Z^{12}$,

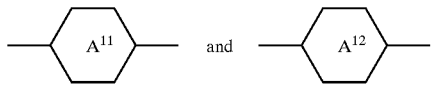

have the respective meanings given above under the formula I, but $Z^{12}$ is not a single bond in the formulae I-4 and I-5.

The compounds of the formula I are particularly preferably selected from the group consisting of the compounds of the formulae I-1a, I-1b, I-2a to I-2f and I-3a to I-3e and very particularly preferably from the group consisting of the compounds of the formulae I-1a, I-2a, I-2b, I-2c, I-3a, I-3b and I-3c and especially preferably from the group consisting of the compounds of the formulae I-2a, I2c, I-3a and I-3c.

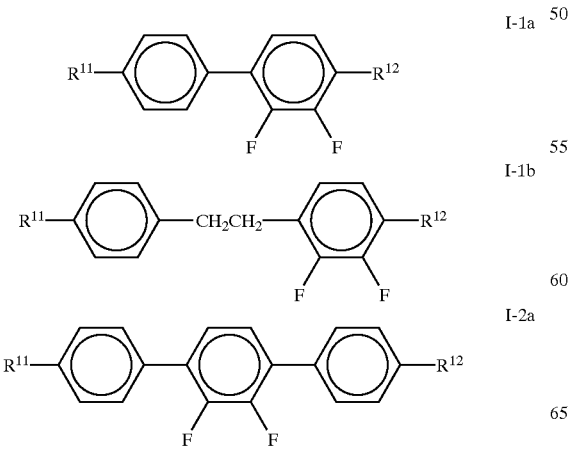

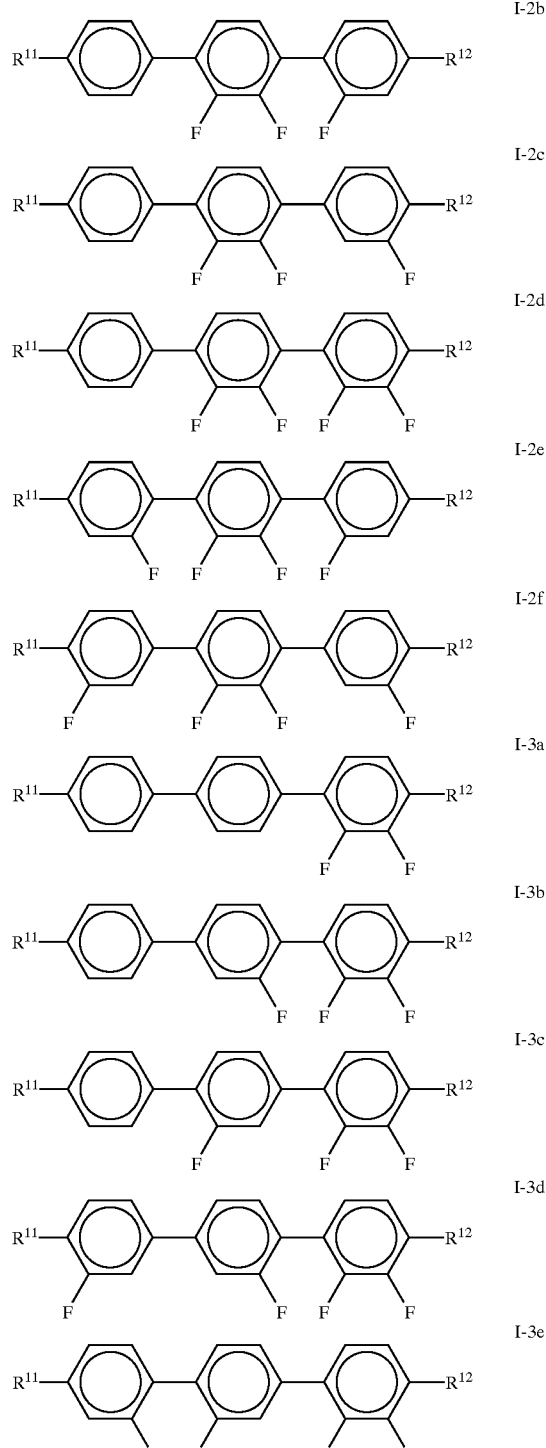

in which $R^{11}$ and $R^{12}$ are as defined above under the formula I, and $R^{11}$ is preferably alkyl having from 1 to 7 carbon atoms or alkenyl having from 2 to 7 carbon atoms, and $R^{12}$ is preferably alkyl having from 1 to 7 carbon atoms, alkoxy having from 1 to 7 carbon atoms or alkenyloxy having from 2 to 7 carbon atoms.

In the present application, in connection with the quoting of the constituents of the compositions:

- "comprise" means that the concentration of the relevant constituents in the composition is preferably 5% or more, particularly preferably 10% or more and very particularly preferably 20% or more,
- "consist predominantly of" means that the concentration of the relevant constituents in the composition is preferably 50% or more, particularly preferably 55% or more and very particularly preferably 60% or more,
- "consist essentially completely of" means that the concentration of the relevant constituents in the composition is preferably 80% or more, particularly preferably 90% or more and very particularly preferably 95% or more, and
- "consist virtually completely of" means that the concentration of the relevant constituents in the composition is preferably 98% or more, particularly preferably 99% or more and very particularly preferably 100.0%.

This applies both to the media as compositions with their constituents, which may be components and compounds, and to the components with their constituents, those of the compounds.

The liquid-crystal media according to the present application preferably comprise one or more compounds selected from each of at least two different formulae selected from the group consisting of the compounds of the formulae I-1, I-2 and I-3, particularly preferably at least one compound selected from each of these three formula.

Component B preferably consists predominantly, particularly preferably consists essentially completely and very particularly preferably consists virtually completely, of one or more compounds selected from the group consisting of the compounds of the formulae II and III.

The compounds of the formula II are preferably selected from the group consisting of the compounds of the formulae II-1 to II-5, preferably II-1 to II-3,

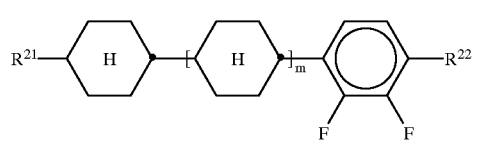

II-1

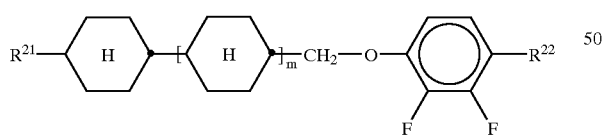

II-2

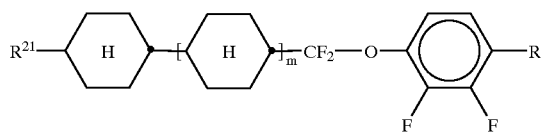

II-3

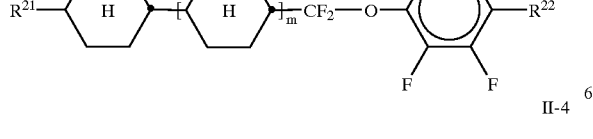

II-4

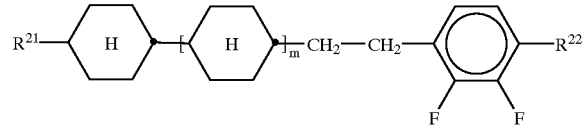

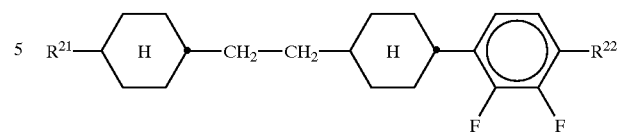

II-5 in which $R^{21}$ and $R^{22}$ are as defined above under the formula II, and $R^{21}$ is preferably n-alkyl having from 1 to 7 carbon atoms, n-alkoxy having from 1 to 7 carbon atoms or alkenyloxy having from 2 to 7 carbon atoms, and $R^{22}$ is preferably n-alkoxy having from 1 to 7 carbon atoms or alkenyloxy having from 2 to 7 carbon atoms, and in the formulae I-1 and I-2 also n-alkyl having from 1 to 7 carbon atoms, m is 0 or 1.

The compounds of the formula III are preferably selected from the group consisting of the compounds of the formulae III-1 to III-6b, preferably III-1 to III-4, particularly preferably III-1, III-4a and III-4b

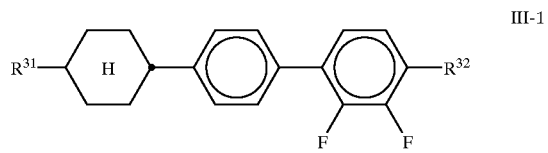

III-1

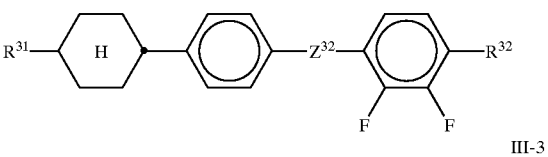

III-2

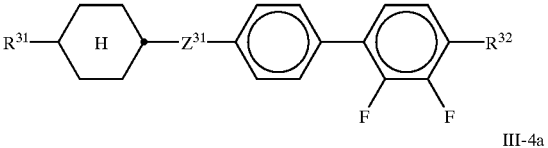

III-3

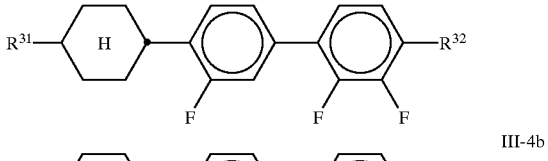

III-4a

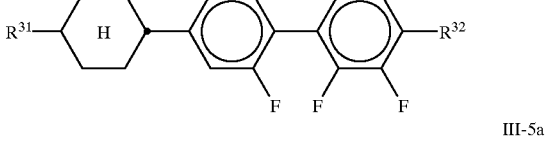

III-4b

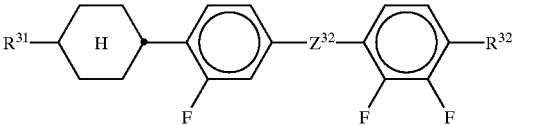

III-5a

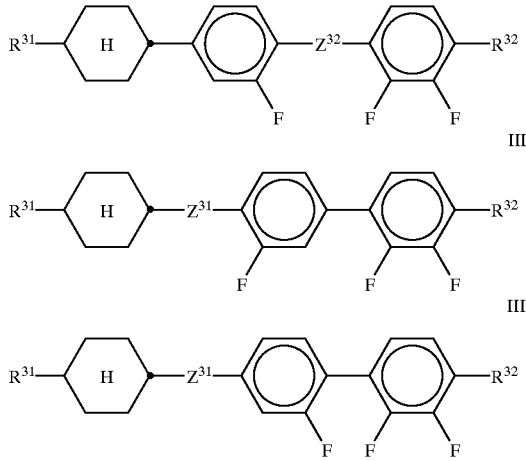

in which

R$^{31}$, R$^{32}$, Z$^{31}$ and Z$^{32}$ are as defined above under the formula III and preferably R$^{31}$ is n-alkyl having from 1 to 7 carbon atoms, n-alkoxy having from 1 to 7 carbon atoms or alkenyloxy having from 2 to 7 carbon atoms, R$^{32}$ is n-alkoxy having from 1 to 7 carbon atoms or alkenyloxy having from 2 to 7 carbon atoms, and in the formulae I2 and I3, is alternatively n-alkyl having from 1 to 7 carbon atoms, and Z$^{31}$ and Z$^{32}$ are each, independently of one another, —CH$_2$—CH$_2$—, —CH$_2$—O—, —CF$_2$—O— or —O—CF$_2$—.

The compounds of the formula VII are preferably selected from the group consisting of the compounds of the formulae VII-1 and VII-2

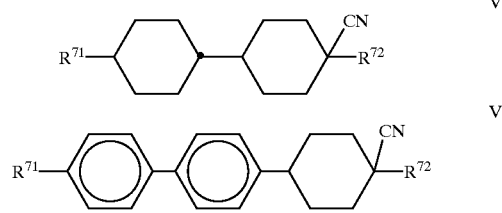

in which

R$^{71}$ and R$^{72}$ are as defined above under the formula VII and are preferably n-alkyl.

The liquid-crystal media particularly preferably comprise one or more compounds selected from the group consisting of the compounds of the formulae II-1a to II-1c, particularly preferably of the formulae II-1a and II-1c

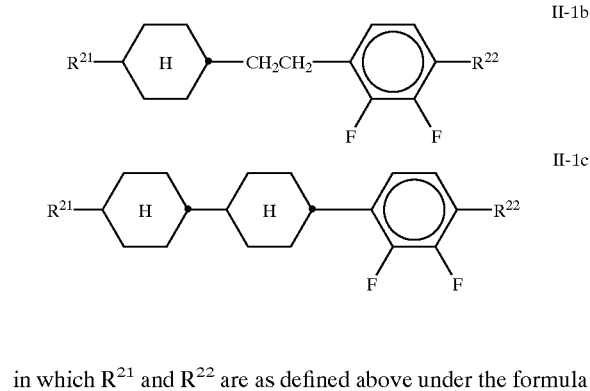

in which R$^{21}$ and R$^{22}$ are as defined above under the formula II and are preferably as defined above under the formula II-1.

The liquid-crystal media particularly preferably comprise one or more compounds of the formula III selected from the group consisting of the compounds of the formulae III-1a, III-3a, III-4a and III-6a, preferably III-1a and III-4a, particularly preferably III-1a.

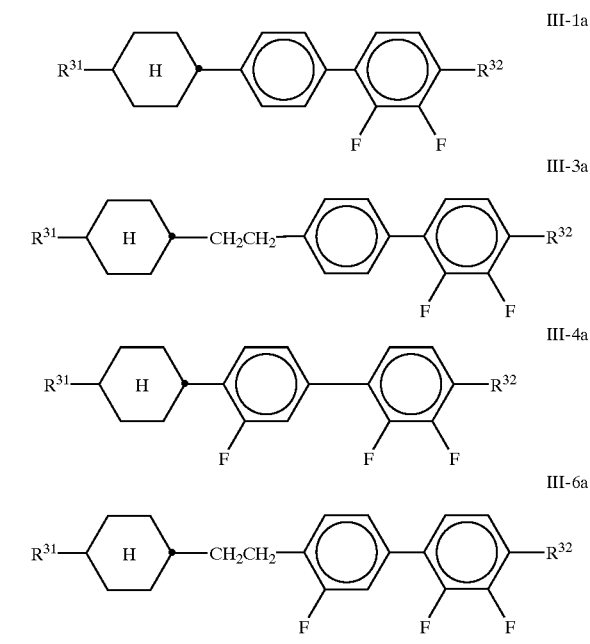

in which R$^{31}$ and R$^{32}$ are as defined above under the formula III and are preferably as correspondingly defined above under the formulae III-1 to III-6.

The liquid-crystal media particularly preferably comprise one or more compounds selected from the group consisting of the compounds of the formulae II-6 and II-7

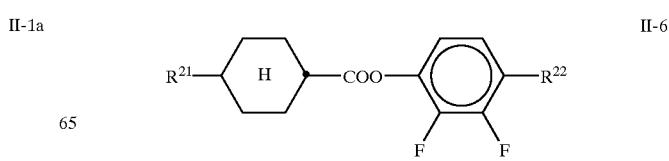

II-7

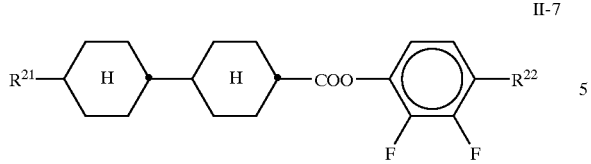

in which $R^{21}$ and $R^{22}$ are as defined above under the formula II and are preferably as defined above under the formula II-1.

The liquid-crystal media particularly preferably comprise one or more compounds of the formula III-2a III-2a

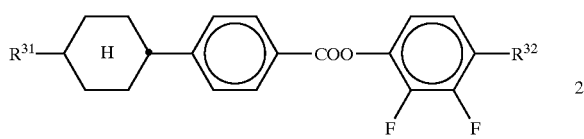

in which $R^{31}$ and $R^{32}$ are as defined above under the formula III and are preferably as defined above under the formula III-2.

Component C preferably consists predominantly, particularly preferably essentially completely and very particularly preferably virtually completely, of one or more compounds of the formula IV. These compounds of the formula IV are preferably selected from the group consisting of the compounds of the formulae IV-1 to IV-3

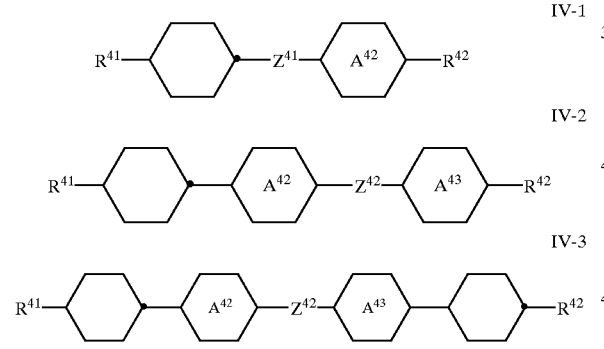

in which $R^{41}$, $R^{42}$, $Z^{41}$, $Z^{42}$,

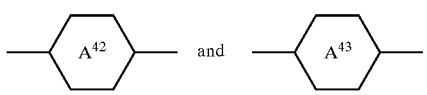

are each as correspondingly defined above under the formula IV.

The liquid-crystal medium especially preferably comprises one or more compounds selected from the group consisting of the compounds of the formulae IV-1a to IV-1d, IV-1e, IV-2a to IV-2e and IV-3a to IV-3c IV-1a

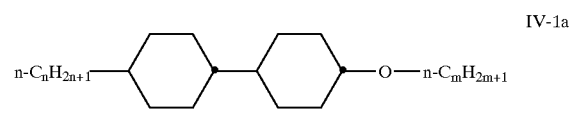

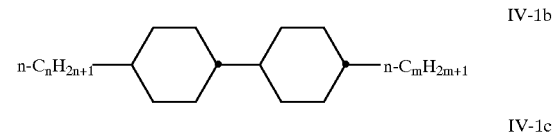

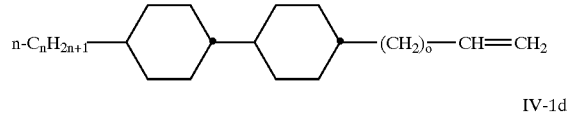

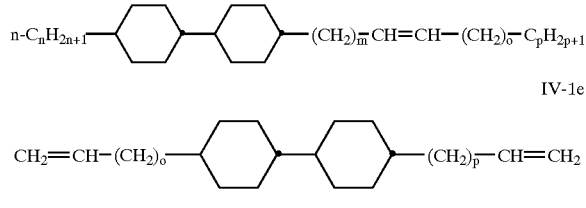

in which n and m are each, independently of one another, from 1 to 5, and o and p are each, both independently thereof and of one another, from 0 to 3,

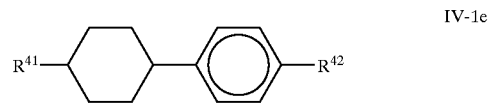

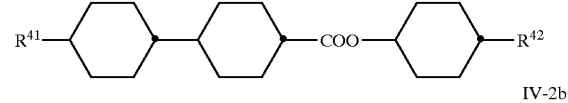

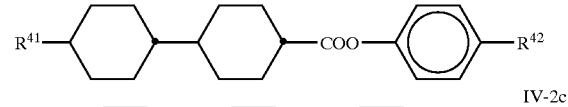

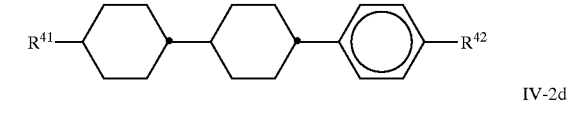

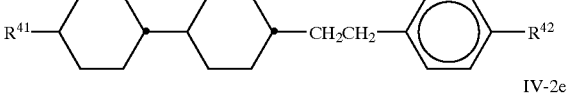

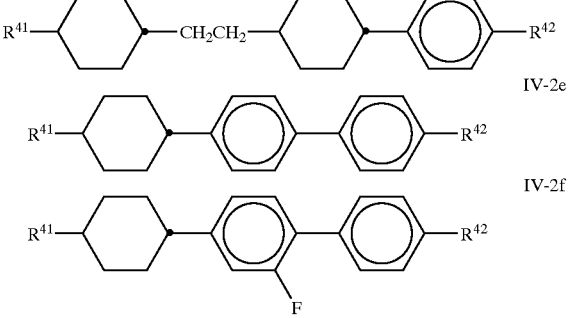

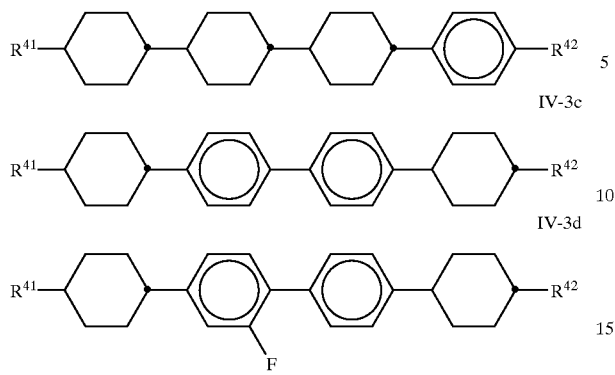

in which $R^{41}$ and $R^{42}$ are each as defined above under the formula IV1, and the phenyl rings may optionally be fluorinated, but not in such a way that the compounds are identical with those of the formula II and the sub-formulae thereof. $R^{41}$ is preferably n-alkyl having from 1 to 5 carbon atoms, particularly preferably having from 1 to 3 carbon atoms, and $R^{42}$ is preferably n-alkyl or n-alkoxy having from 1 to 5 carbon atoms or alkenyl having from 2 to 5 carbon atoms. Of these, particular preference is given to compounds of the formulae IV1a to IV1d.

Component D preferably consists predominantly, particularly preferably essentially completely and very particularly preferably virtually completely, of one or more compounds of the formula V. These compounds of the formula V are preferably selected from the group consisting of the compounds of the formulae V-1 to V-4

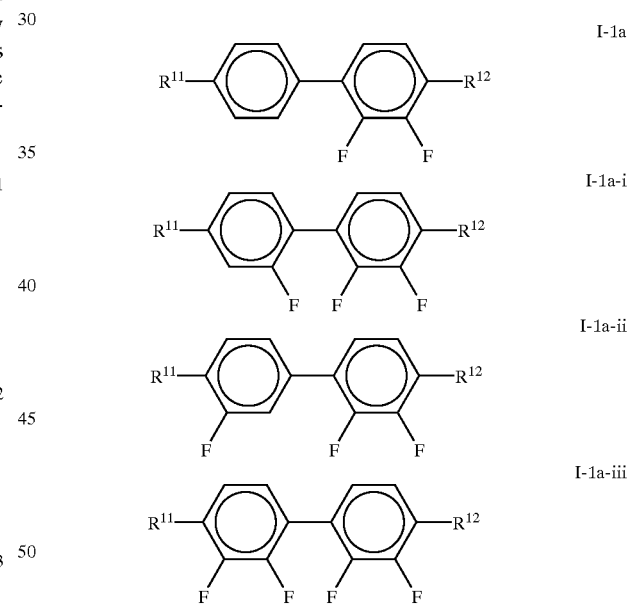

in which $R^5$, $Z^{52}$, $Z^{53}$ and

are as defined above for the formula I, but preferably
$R^5$ is alkyl having 1–7 carbon atoms or alkenyl having 2–7 carbon atoms, preferably vinyl or 1E-alkenyl,
one of
$Z^{52}$ and $Z^{53}$ is a single bond and the other is —CH$_2$CH$_2$—, —COO— or a single bond, and

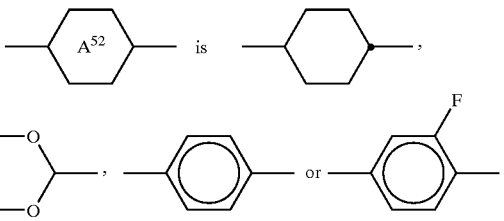

In a preferred embodiment, the medium comprises one or more compounds which contain precisely two phenyl rings, which may be substituted, selected from the group consisting of the formulae I and VI, preferably selected from the group consisting of the compounds of the formulae I-1a, I-1a-i to I-1a-iii in which $R^{11}$ and $R^{12}$ are as defined above under the formula I, preferably under the formula I-1.

The individual compounds of the formulae I–VII and further compounds which can be used in the liquid-crystal displays according to the invention are either known or can be prepared analogously to the known compounds by processes known per se, such as those described in Houben-Weyl, Methoden der organischen Chemie, Thieme-Verlag, Stuttgart, Germany.

In a preferred embodiment, the liquid-crystal media according to the invention comprise in total, based on the mixture as a whole,
from 5% to 85%, preferably from 10% to 55% and particularly preferably from 10% to 30%, of component A, preferably of compounds of the formula I, from 5% to 85%, preferably from 10% to 85%, particularly preferably from 20% to 80% and very particularly preferably from 40% to 75%, of component B, preferably of compounds of the formulae II and III, from 0% to 50%, preferably from 0% to 40%, particularly preferably from 10% to 40% and very particularly preferably from 5% to 25%, of component C, preferably of compounds of the formula IV, and from 0% to 40%, preferably from 0% to 30%, particularly preferably from 0% to 20%, and very particularly preferably from 1% to 10%, of component D, preferably of compounds of the formula IV.

Here, as throughout the present application, the term compounds, also written as compound(s), means both one and a plurality of compounds, unless explicitly stated otherwise.

The individual compounds are each employed here in concentrations of from 1% to 25%, preferably from 2% to 20% and particularly preferably from 4% to 16%. An exception is formed here by compounds having three phenyl rings and compounds having four six-membered rings. These compounds are each employed in concentrations of from 0.5% to 15%, preferably from 1% to 10% and particularly preferably from 1% to 8% per individual compound. In the case of compounds of the formula I in which n=0, the preferred limits to the concentrations for the proportion of the individual compounds in the medium are from 1% to 20%, preferably from 2% to 15% and particularly preferably from 5% to 12%. In the case of the compounds of the formula I in which n=1, the preferred limits to the concentrations for the proportion of the individual compounds in the medium are from 1% to 30%, preferably from 2% to 20% and particularly preferably from 8% to 12%.

In a preferred embodiment, the liquid-crystal media particularly preferably comprise in total
from 10% to 35% of compounds of the formula I,
from 50% to 90% of compounds of the formulae II and III,
from 0% to 40% of compounds of the formula IV, and
from 0% to 20% of compounds of the formula V.

In this embodiment, the liquid-crystal media very particularly preferably comprise in total
from 15% to 30% of compounds of the formula I,
from 60% to 80% of compounds of the formulae II and III,
from 0% to 20% of compounds of the formula IV and
from 0% to 5% of compounds of the formula V.

In a particularly preferred embodiment, which may be identical and preferably is identical with the preferred embodiments described above for the preferred concentration ranges, the liquid-crystal media comprise:

one or more compounds of the formula I, preferably selected from the group consisting of the compounds of the formulae I-2a to I-2c and I-3a to I-3c, and/or, preferably and, one or more compounds of the formula II-1, and/or, preferably and, one or more compounds selected from the group consisting of the compounds of the formulae IV-1 and IV-2, preferably
one or more compounds selected from the group consisting of the compounds of the formulae IV-1a to IV-1e, IV-2c and IV-2e, very particularly preferably selected from the group consisting of the formulae IV-1c, IV-2c and IV-1d and in particular of the formula IV-2c, and/or, preferably and, one or more compounds selected from the group consisting of the compounds of the formulae V to VII.

Particular preference is given here to liquid-crystal media which comprise
one or more compounds of the formula I, preferably selected from the group consisting of the compounds of the formulae I-2a, I-2c, I-3a and I-3c, preferably in which $R^{11}$ is n-alkyl and $R^{12}$ is alkoxy or alkyl, and in particular in each case in concentrations of from 6% to 15% per compound, and/or one or more compounds of the formula II-1a and/or II-1c, in particular in each case in concentrations of from 4% to 20% per compound, preferably in each case one or more compounds in which $R^{21}$ is alkyl having 1–5 carbon atoms and $R^{22}$ is having 1–4 carbon atoms, and/or one or more compounds of the formula II-1a, in particular in each case in concentrations of from 3% to 15% per compound, preferably in each case one or more compounds in which $R^{31}$ is alkyl having from 1 to 3 carbon atoms and $R^{32}$ is alkoxy having from 1 to 4 carbon atoms, and/or one or more compounds of the formula IV-1a to IV-1c and/or IV-2c, preferably of the formulae IV-1c and/or IV-2c.

These media may, if desired, comprise one or more compounds selected from the group consisting of the compounds of the formulae V.

The liquid-crystal media according to the invention preferably have nematic phases of in each case from −20° C. to 70° C., particularly preferably from −30° C. to 80° C. and very particularly preferably from −40° C. to 90° C. and most preferably from −40° C. to 105° C.

The term "have a nematic phase" here means firstly that no smectic phase and no crystallisation are observed at low temperatures at the corresponding temperature and secondly also that no clearing occurs on heating from the nematic phase. The investigation at low temperatures is carried out in a flow viscometer at the corresponding temperature and checked by storage for at least 100 hours in test cells having a layer thickness corresponding to the electro-optical application. At high temperatures, the clearing point is measured in capillaries by conventional methods.

Furthermore, the liquid-crystal media according to the invention are characterised by relatively high optical anisotropy values. The birefringence values are preferably in the range from 0.090 to 0.180, particularly preferably in the range from 0.105 to 0.160 and very particularly preferably in the range from 0.110 to 0.150.

In addition, the liquid-crystal media according to the invention have low values for the threshold voltage ($V_0$), preferably less than or equal to 2.2 V, preferably less than or equal to 2.0 V, particularly preferably less than or equal to 1.9 V and very particularly preferably less than or equal to 1.85 V.

These preferred values for the individual physical properties are also observed in each case in combination with one another.

Thus, the liquid-crystal media according to the invention have, for example with a clearing point of 90° C. or less and a value of the dielectric anisotropy ($|\Delta\epsilon|$) of 5 or less,
for a birefringence of 0.15 or less, a rotational viscosity of 260 mPa·s or less,
for a birefringence of 0.12 or less, a rotational viscosity of 223 mPa·s or less, and
for a birefringence of 0.10 or less, a rotational viscosity of 211 mPa·s or less.

With a clearing point of 70° C. or less and a value of the dielectric anisotropy ($|\Delta\epsilon|$) of 3.5 or less, the liquid-crystal media according to the invention have for a birefringence of 0.15 or less, a rotational viscosity of 155 mPa·s or less, for a birefringence of 0.12 or less, a rotational viscosity of 120 mPa·s or less, for a birefringence of 0.11 or less, a rotational viscosity of 118 mPa·s or less, and for a birefringence of 0.10 or less, a rotational viscosity of 115 mPa·s or less.

Independently of the above-mentioned dimensioning limits for the compounds of the formulae I, II and III, compounds of the formulae I and II are employed in the liquid-crystal media in accordance with the present invention in a concentration of up to about 25% per individual substance, and compounds of the formula III are employed in a concentration of up to about 20%, preferably up to 16%, per individual substance. Compounds of the formula I, preferably of the formulae I-1 to I-3, are preferably employed in concentrations of up to about 15%, preferably up to 10%, per individual substance.

In the present application, "≦" means less than or equal to, preferably less than, and "≧" means greater than or equal to, preferably greater than.

In the present application,

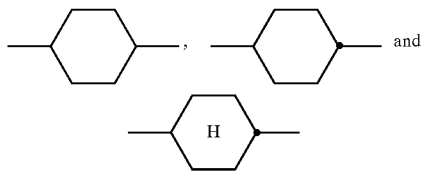

denote trans-1,4-cyclohexylene.

In the present application, the term dielectrically positive compounds means compounds having a Δε of >1.5, dielectrically neutral compounds means those in which −1.5≦Δε≦1.5, and dielectrically negative compounds means those having a Δε<−1.5. The dielectric anisotropy of the compounds is determined here by dissolving 10% of the compounds in a liquid-crystalline host and determining the capacitance of this mixture at 1 kHz in at least one test cell having a thickness of 20 μm with a homeotropic surface alignment and in at least one test cell having a thickness of 20 μm with a homogeneous surface alignment. The measurement voltage is typically from 0.5 V to 1.0 V, but is always less than the capacitive threshold of the respective liquid-crystal mixture.

The host mixture used for dielectrically positive and dielectrically neutral compounds is ZLI-4792 and the host mixture used for dielectrically negative compounds is ZLI-2857, both from Merck KGaA, Germany. The change in the dielectric constants of the host mixture after addition of the compound to be investigated and extrapolation to 100% of the compound employed gives the values for the respective compounds to be investigated.

The term threshold voltage usually relates to the optical threshold for 10% relative contrast ($V_{10}$), unless explicitly stated otherwise.

In relation to the liquid-crystal mixtures of negative dielectric anisotropy, however, the term threshold voltage in the present application is used for the capacitive threshold voltage ($V_0$), also known as the Freedericksz threshold, unless explicitly stated otherwise.

All concentrations in this application, unless explicitly stated otherwise, are given in per cent by weight and relate to the corresponding mixture or mixture component. All physical properties are and have been determined in accordance with "Merck Liquid Crystals, Physical Properties of Liquid Crystals", status November 1997, Merck KGaA, Germany, and apply to a temperature of 20° C., unless explicitly stated otherwise. Δn is determined at 589 nm and Δε at 1 kHz.

In the case of the liquid-crystal media of negative dielectric anisotropy, the threshold voltage was determined as the capacitive threshold $V_0$ (also known as the Freedericksz threshold) in test cells produced at Merck KgaA, Germany, with a liquid-crystal aligned homeotropically by means of the alignment layer SE 1211 from Nissan Chemicals.

The dielectrics may also comprise further additives known to the person skilled in the art and described in the literature.

For example, 0–15% by weight of pleochroic dyes may be added, furthermore conductive salts, preferably ethyldimethyldodecylammonium 4-hexyl-oxybenzoate, tetrabutylammonium tetraphenylboranate or complex salts of crown ethers (cf., for example, Haller et al., Mol. Cryst. Liq. Cryst. 24, 249–258 (1973)) for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The liquid-crystal media according to the invention may, if necessary, also comprise further additives and chiral dopants in the conventional amounts. The amount of these dopants employed is in total from 0% to 10%, based on the amount of the mixture as a whole, preferably from 0.1% to 6%. The concentrations of the individual compounds employed are preferably from 0.1 to 3%. The concentration of these and similar additives is not taken into account when indicating the concentrations and the concentration ranges of the liquid-crystal compounds in the liquid-crystal media.

Dopants which can be added to the mixtures according to the invention are indicated below:

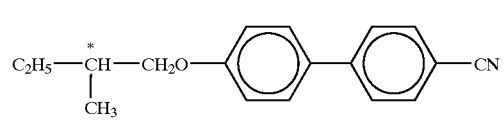

C 15

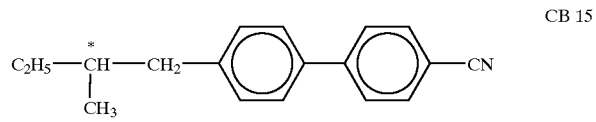

CB 15

-continued

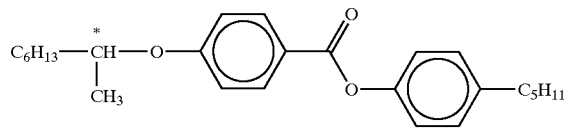
CM 21

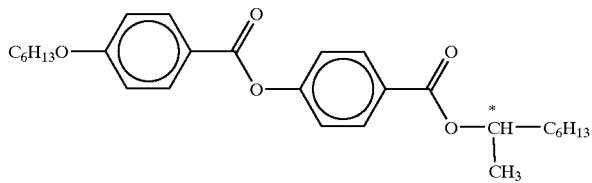
R/S-811

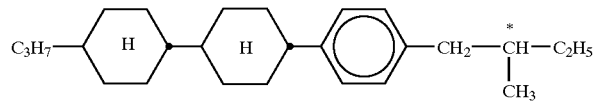
CM 45

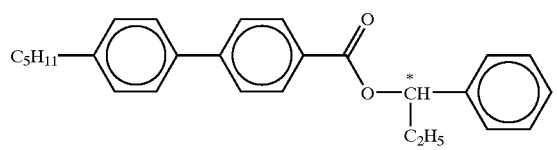
CM 44

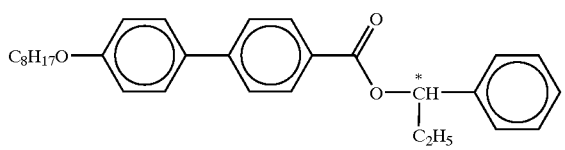
CM 47

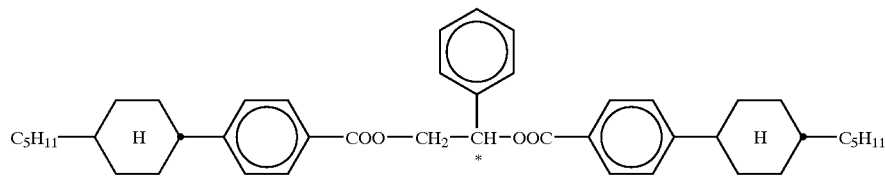
R/S-1011

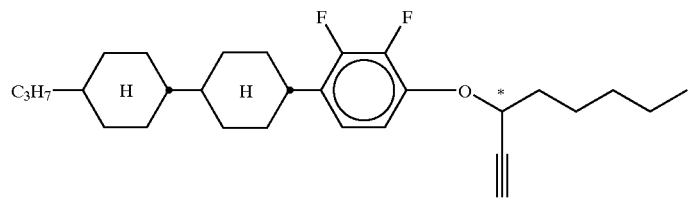
R/S-3011

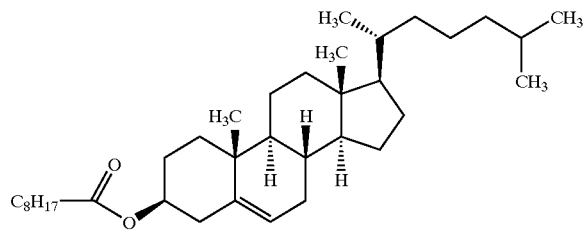
R/S-4011

CN

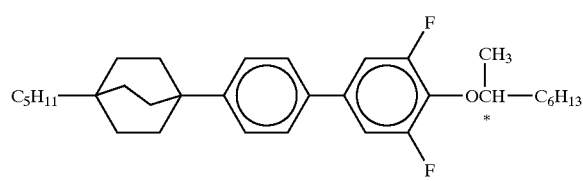
R/S-2011

The compositions consist of a plurality of compounds, preferably from 3 to 30, particularly preferably from 6 to 20 and very particularly preferably from 10 to 16 compounds, which are mixed in a conventional manner. In general, the desired amount of the components used in smaller amount is dissolved in the components making up the principal constituent, advantageously at elevated temperature. If the selected temperature is above the clearing point of the principal constituent, the completion of the dissolution process is particularly easy to observe. However, it is also possible to prepare the liquid-crystal mixtures in other conventional ways, for example using premixes or from a so-called "multibottle system".

By means of suitable additives, the liquid-crystal phases according to the invention can be modified in such a way that they can be employed in any type of ECB, VAN, IPS, GH or ASM-PA LCD display that has been disclosed hitherto.

The examples below serve to illustrate the invention without representing a limitation. In the examples, the melting point T (C,N), the transition from the smectic (S)

phase to the nematic (N) phase T(S,N) and the clearing point T (N,I) of a liquid-crystal substance are indicated in degrees Celsius.

Unless explicitly stated otherwise, the percentages above and below are per cent by weight, and the physical properties are the values at 20° C., unless explicitly stated otherwise.

Unless characterised otherwise, all percentages above and below are per cent by weight and all physical properties are the values at 20° C., unless explicitly stated otherwise.

All the indicated values for temperatures in this application are ° C. and all temperature differences are correspondingly differential degrees, unless explicitly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |

-continued

| Code for $R^1$, $R^2$, $L^1$, $L^2$, $L^3$ | $R^1$ | $R^2$ | $L^1$ | $L^2$ | $L^3$ |
|---|---|---|---|---|---|
| nmFF | $C_nH_{2n+1}$ | $C_mH_{2m+1}$ | H | F | F |
| nOmFF | $C_nH_{2n+1}$ | $OC_mH_{2m+1}$ | H | F | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nOF | $OC_nH_{2n+1}$ | F | H | H | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |
| nCF$_3$ | $C_nH_{2n+1}$ | CF$_3$ | H | H | H |
| nCF$_3$.F | $C_nH_{2n+1}$ | CF$_3$ | F | H | H |
| nCF$_3$.F.F | $C_nH_{2n+1}$ | CF$_3$ | F | F | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| nOCF$_3$.F.F | $C_nH_{2n+1}$ | OCF$_3$ | F | F | H |
| nOCF$_2$ | $C_nH_{2n+1}$ | OCHF$_2$ | H | H | H |
| nOCF$_2$.F | $C_nH_{2n+1}$ | OCHF$_2$ | F | H | H |
| nOCF$_2$.F.F | $C_nH_{2n+1}$ | OCHF$_2$ | F | F | H |
| NS | $C_nH_{2n+1}$ | NCS | H | H | H |
| nS.F | $C_nH_{2n+1}$ | NCS | F | H | H |
| nS.F.F | $C_nH_{2n+1}$ | NCS | F | F | H |
| RVsN | $C_rH_{2r+1}$—CH=CH—$C_sH_{2s}$— | CN | H | H | H |
| REsN | $C_rH_{2r+1}$—O—$C_sH_{2s}$— | CN | H | H | H |

TABLE A

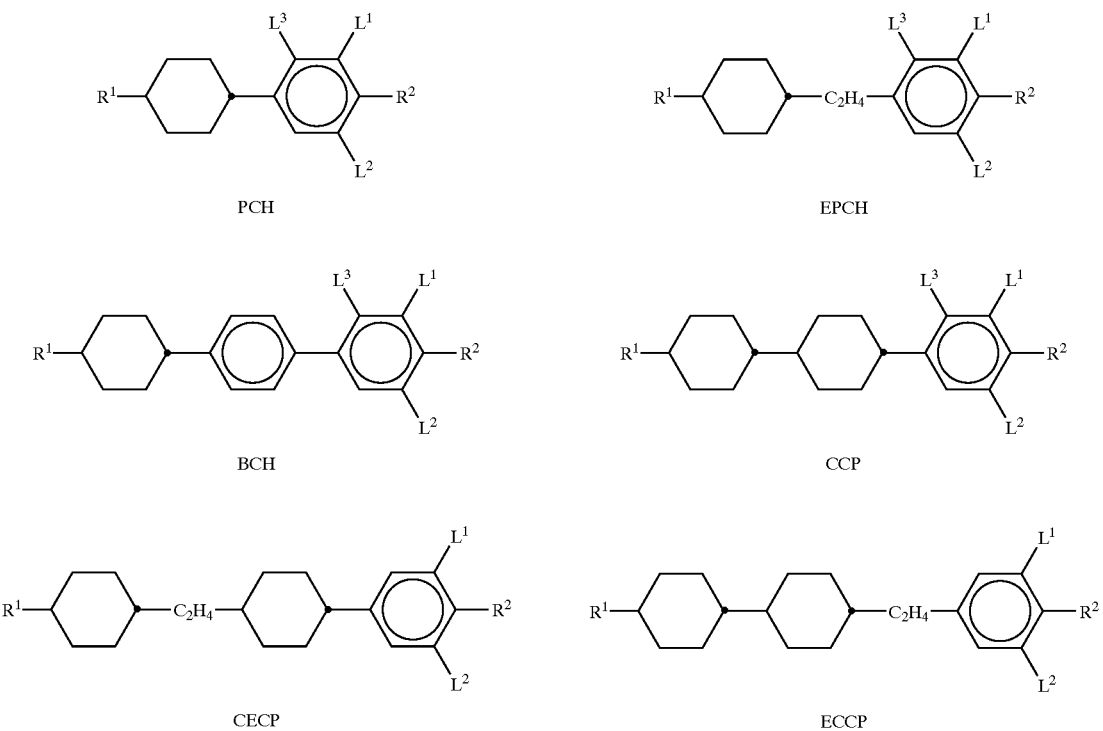

PCH

EPCH

BCH

CCP

CECP

ECCP

TABLE A-continued
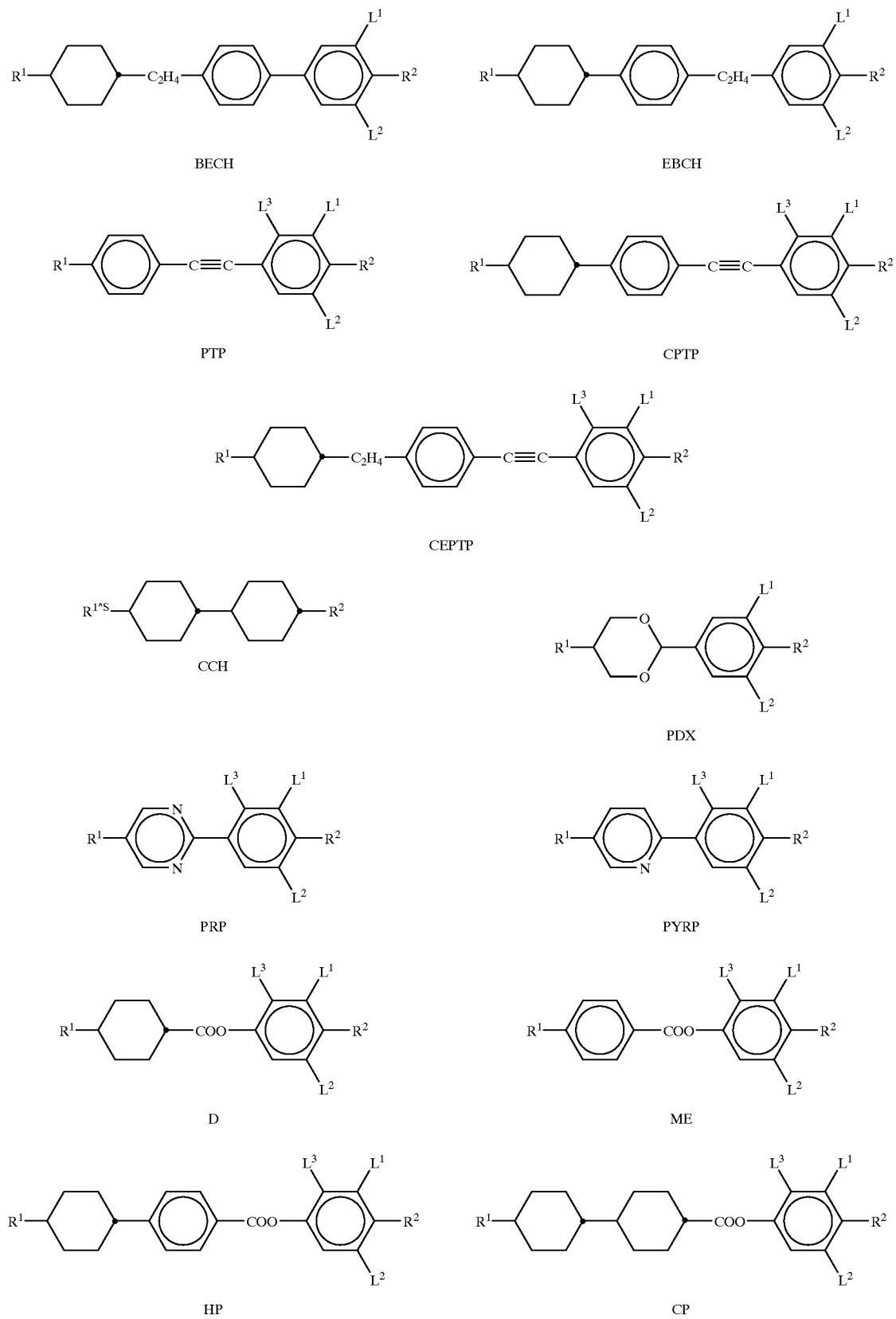

TABLE A-continued
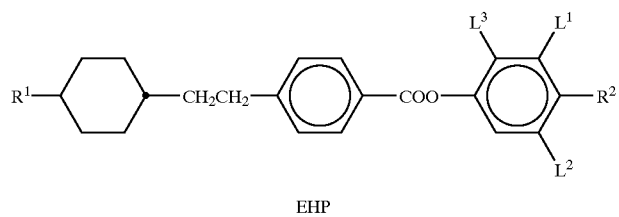
EHP
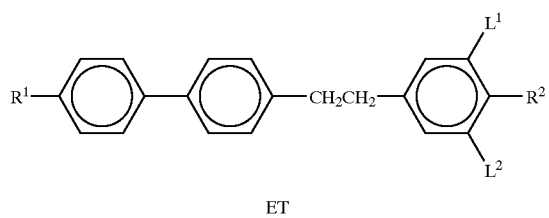
ET
TABLE B
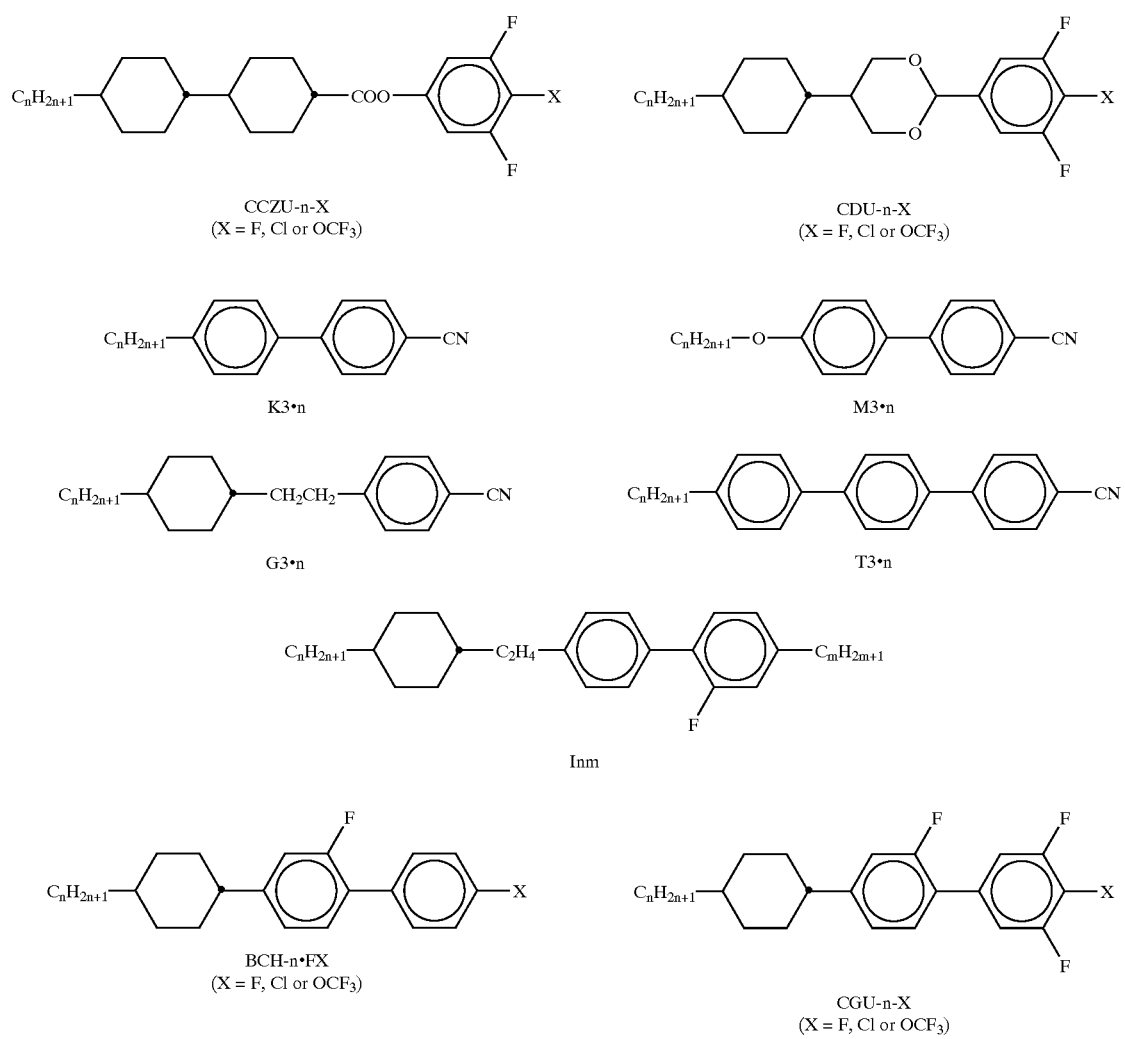

TABLE B-continued
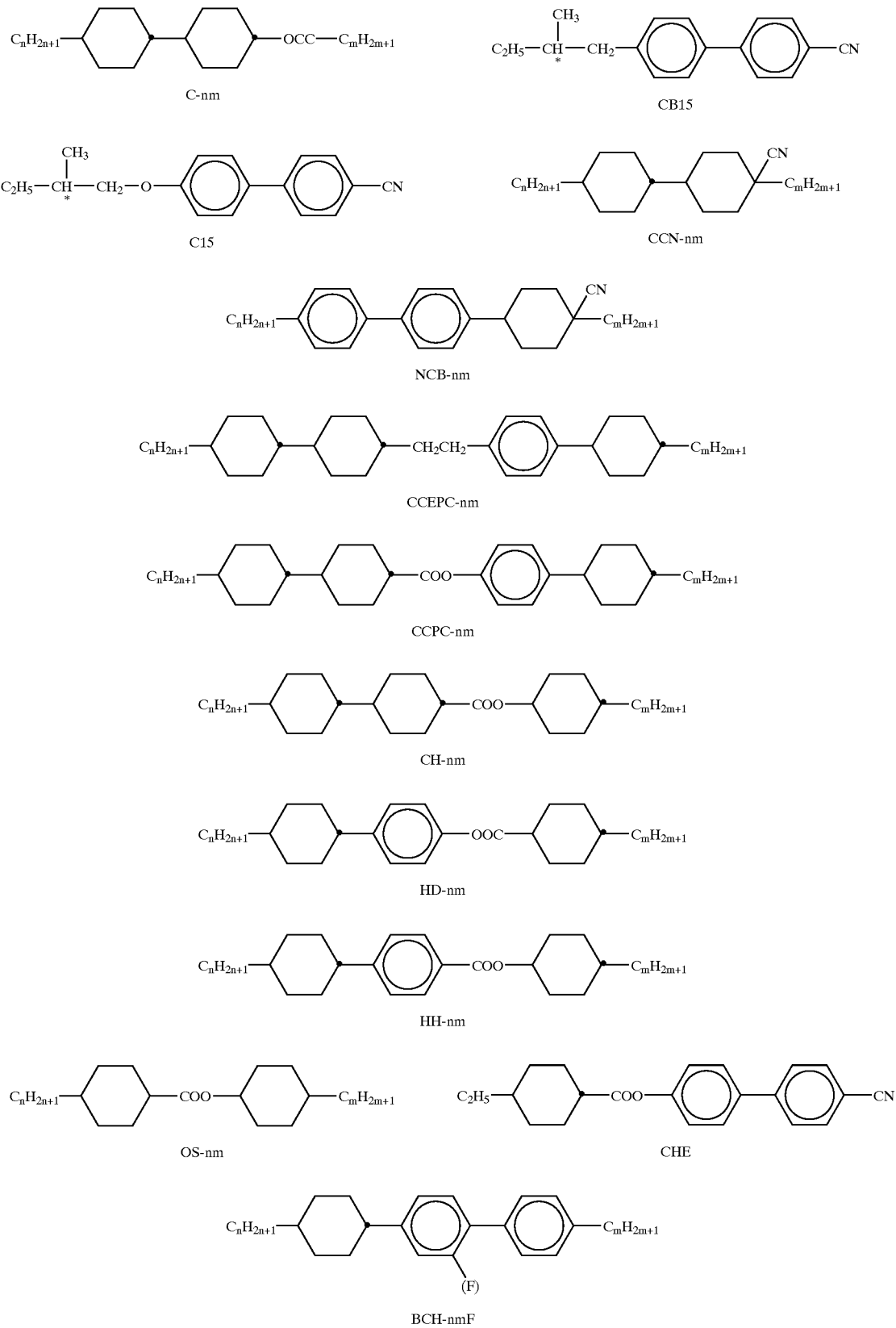

TABLE B-continued
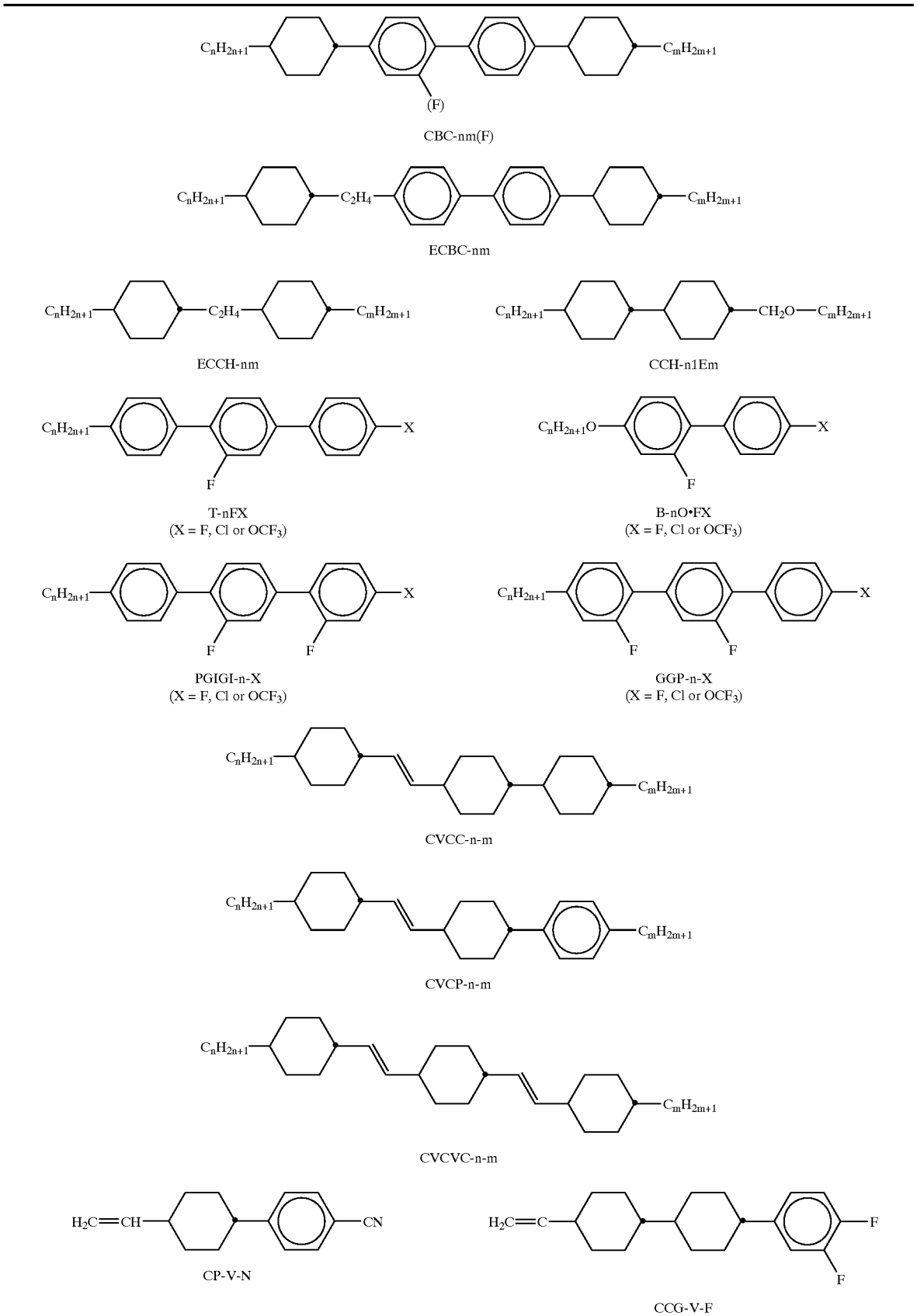

TABLE B-continued
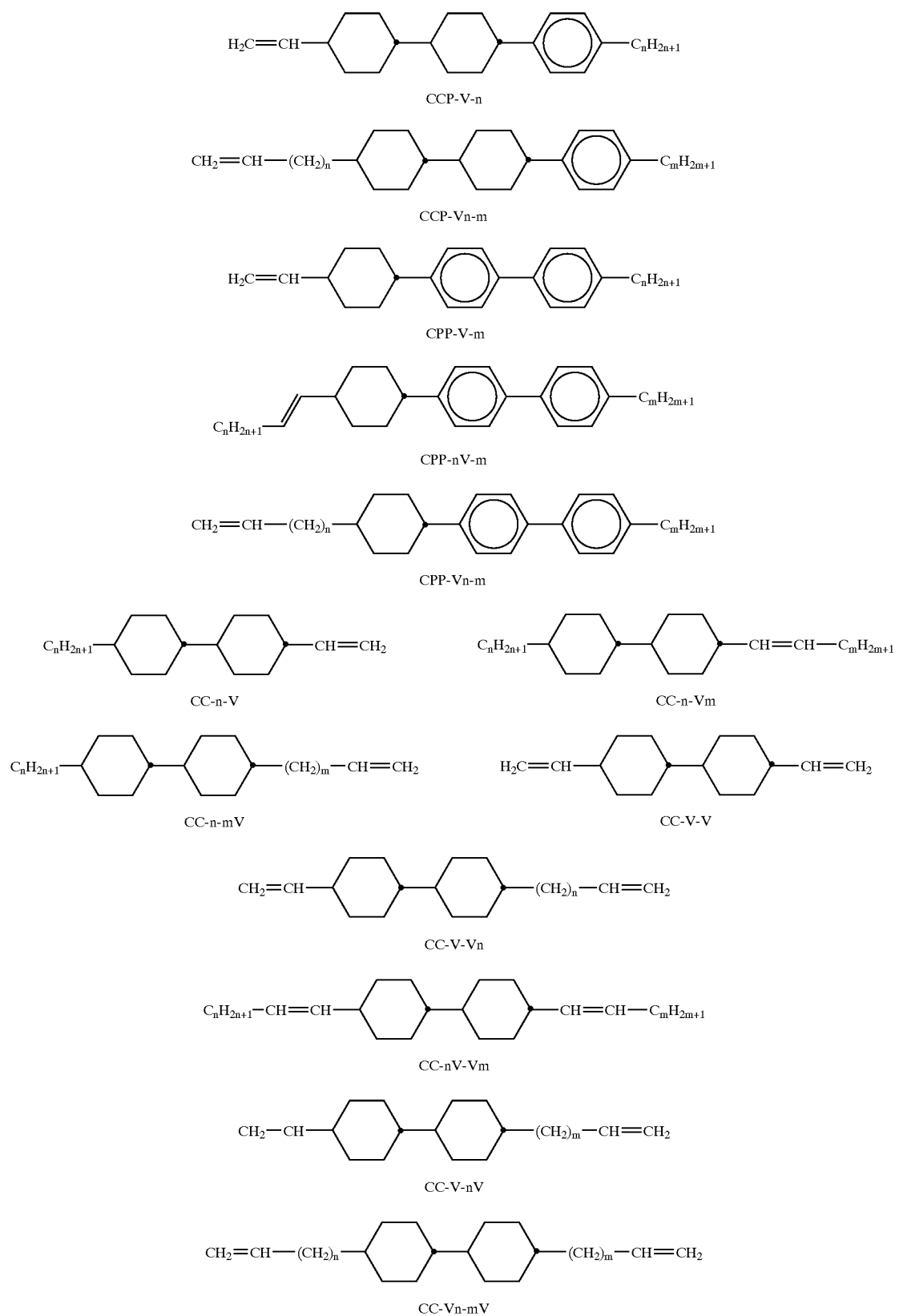

TABLE B-continued
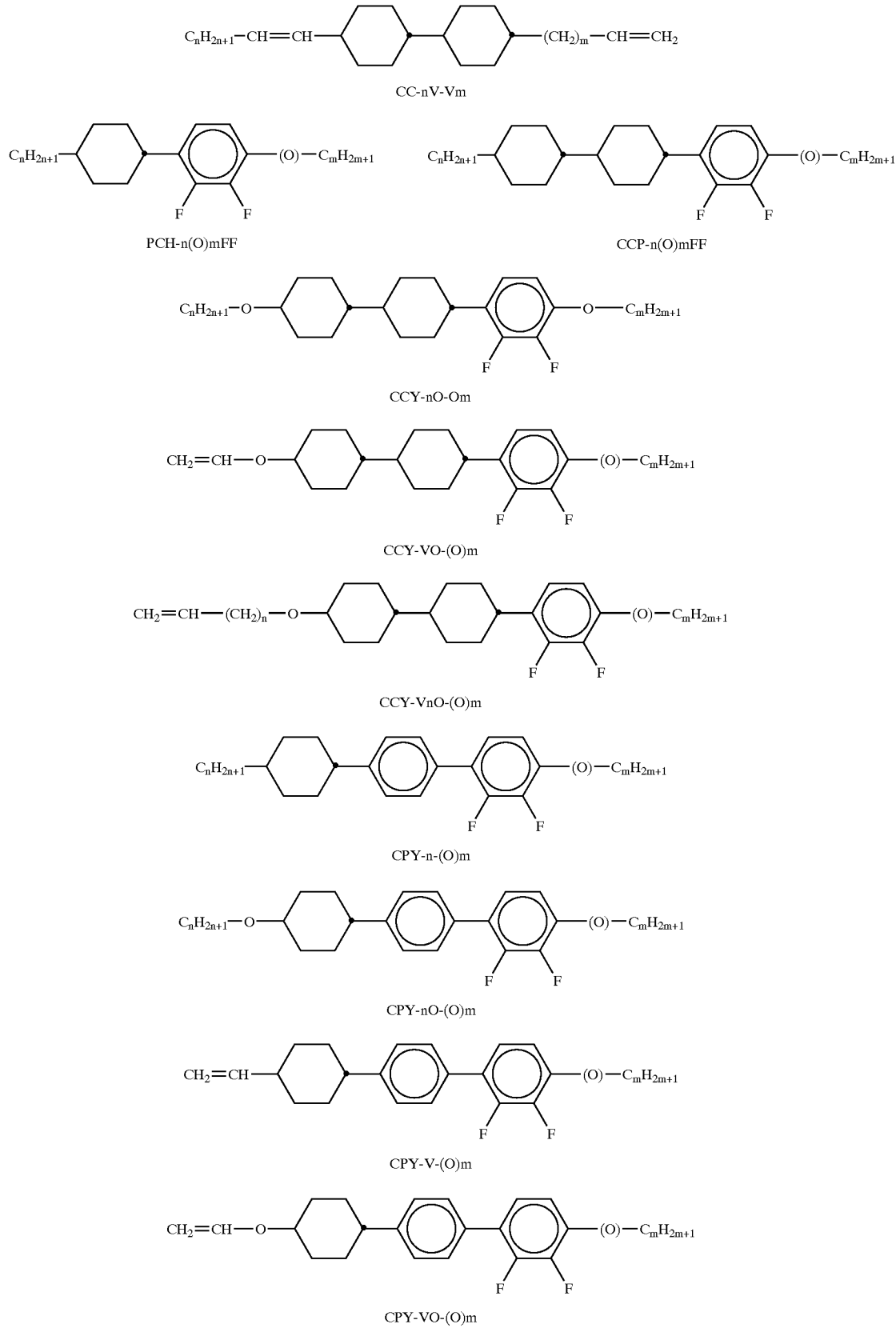

TABLE B-continued
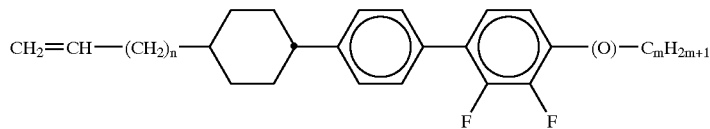
CPY-Vn-(O)m
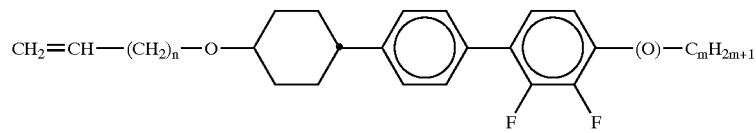
CPY-VnO-(O)m
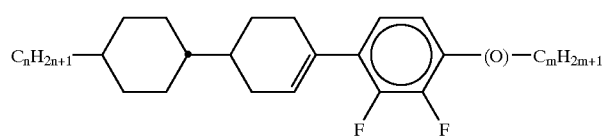
CLY-n-(O)m
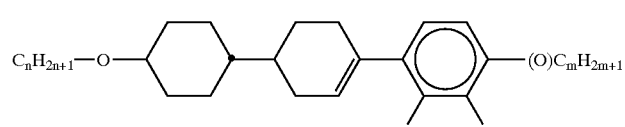
CLY-nO-(O)m
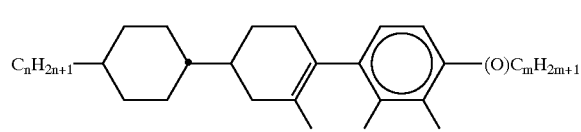
CFY-n-(O)m
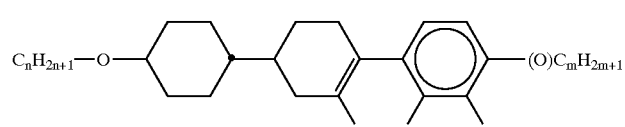
CFY-nO-(O)m
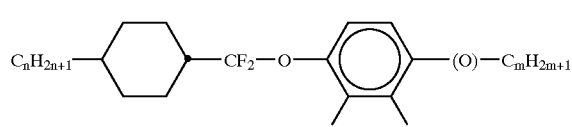
CQY-n-(O)m
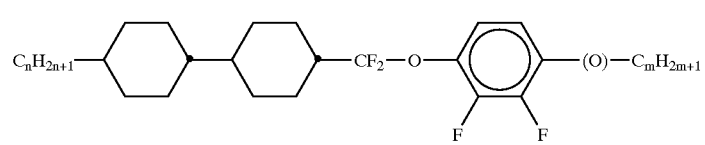
CCQY-n-(O)m
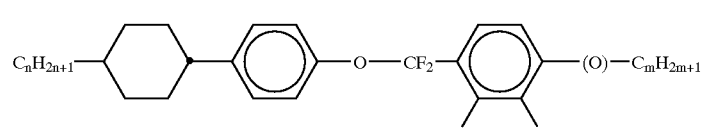
CPQIY-n-(O)m TABLE B-continued
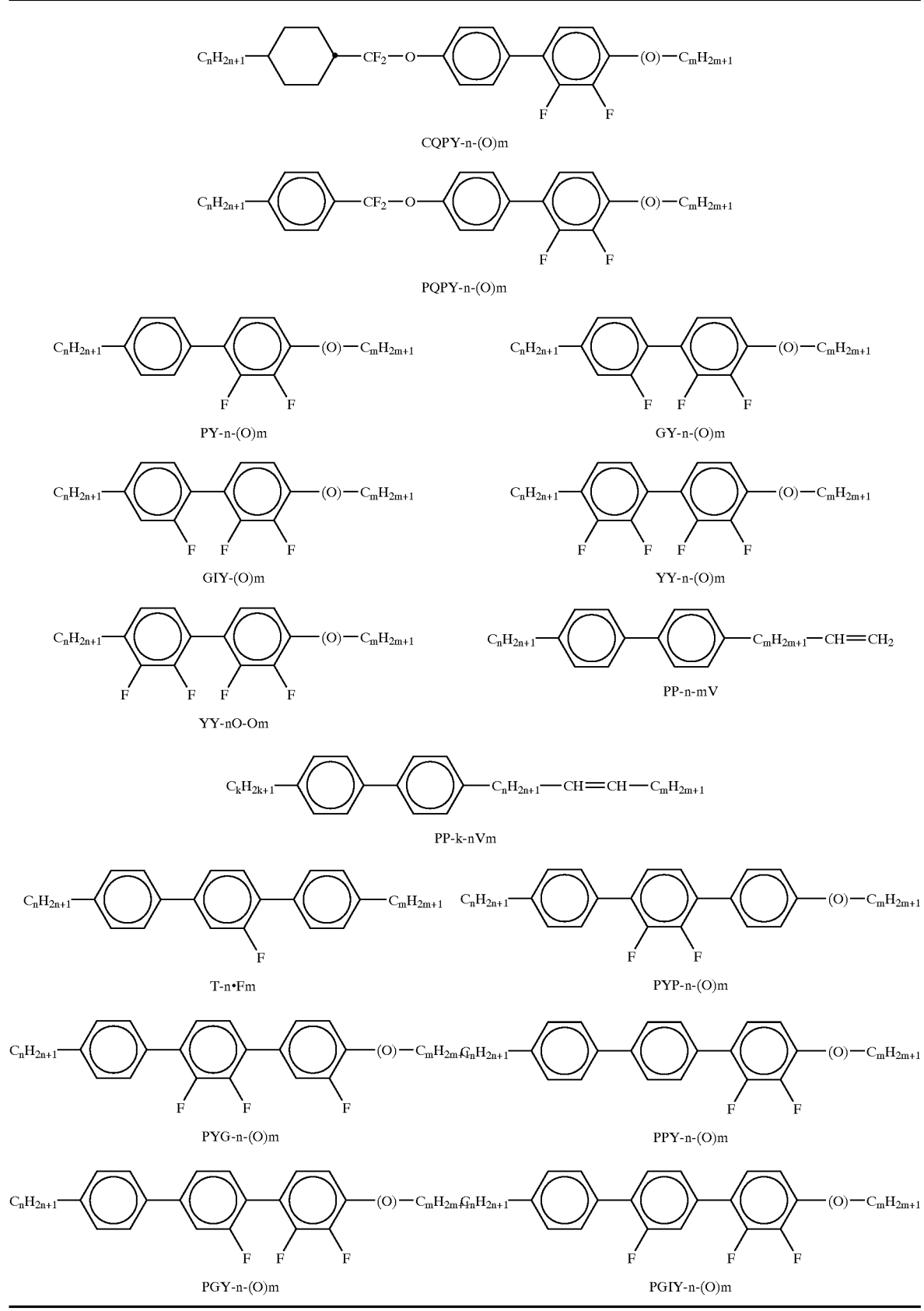

The liquid-crystal media according to the invention preferably comprise five or more, particularly preferably six or more and very particularly preferably seven or more, compounds selected from the formulae from Tables A and B.

The liquid-crystal media according to the invention preferably comprise two or more, particularly preferably three or more and very particularly preferably four or more, compounds selected from the formulae from Table A.

The liquid-crystal media according to the invention preferably comprise three or more, particularly preferably four or more and very particularly preferably five or more, compounds selected from the formulae from Table B.

These compounds are preferably compounds of different formulae from these tables.

EXAMPLES

The following examples are intended to illustrate the invention without representing a limitation. Above and below, percentages are per cent by weight. All temperatures are indicated in degrees Celsius. $\Delta n$ denotes optical anisotropy (589 nm, 20° C.), $\Delta\epsilon$ denotes the dielectric anisotropy (1 kHz, 20° C.), H.R. denotes the voltage holding ratio (at 100° C., after 5 minutes in the oven, 1 V), and $V_0$, the threshold voltage, was determined at 20° C.

Comparative Example 1

The liquid-crystal mixture of Example 3 in GB 2300642 was prepared. The composition and physical properties of this mixture are shown in the following table.

| Compound/ abbreviation | Concentration/ % by weight | Physical properties | |
|---|---|---|---|
| CCN-47 | 19.0 | T (N, I) = | 90.0° C. |
| CCN-55 | 20.0 | $n_e$ (20° C., 589 nm) = | 1.5793 |
| PCH-301 | 5.0 | $\Delta n$ (20° C., 589 nm) = | 0.0912 |
| PCH-304 | 6.0 | $\epsilon_\parallel$ (20° C., 1 kHz) = | 3.5 |
| PCH-53 | 6.0 | $\Delta\epsilon$ (20° C., 1 kHz) = | -2.9 |
| CH-33 | 4.0 | $\gamma_1$ (20° C.) = | 286 mPa · s |
| CH-35 | 4.0 | $V_0$ (20° C.) = | 2.43 V |
| CH-43 | 4.0 | | |
| CH-45 | 4.0 | | |
| CBC-33F | 3.0 | | |
| CBC-53F | 4.0 | | |
| CBC-55F | 4.0 | | |
| PGIGI-3-Cl | 6.0 | | |
| PGIGI-5-Cl | 6.0 | | |
| PGIGI-3-F | 5.0 | | |
| Σ | 100.0 | | |

The liquid-crystal medium is introduced into a VA display with TFT addressing. This display has a relatively high addressing voltage and comparatively long response times.

Example 1

A liquid-crystal mixture having a similar composition to that of Comparative Example 1 was prepared. This mixture comprises virtually the same compounds in virtually the same concentrations as that of the comparative example. The main change is the use of the fluorinated terphenyls of the formula I according to the present application instead of the laterally fluorinated terphenyls with terminal polar substituents of the comparative mixture. The clearing point and birefringence of the mixture of this example were set to the corresponding values of the comparative example. The composition and physical properties of this mixture are shown in the following table.

| Compound/ abbreviation | Concentration/ % by weight | Physical properties | |
|---|---|---|---|
| CCN-47 | 19.0 | T (N, I) = | 90.5° C. |
| CCN-55 | 18.0 | $n_e$ (20° C., 589 nm) = | 1.5694 |
| PCH-304 | 6.0 | $\Delta n$ (20° C., 589 nm) = | 0.0899 |
| PCH-53 | 5.0 | $\epsilon_\parallel$ (20° C., 1 kHz) = | 3.6 |
| CH-33 | 4.0 | $\Delta\epsilon$ (20° C., 1 kHz) = | -3.4 |
| CH-35 | 4.0 | $\gamma_1$ (20° C.) = | 220 mPa · s |
| CH-43 | 4.0 | $V_0$ (20° C.) = | 2.17 V |
| CH-45 | 4.0 | | |
| CC-3-V1 | 11.0 | | |
| CBC-33F | 3.0 | | |
| CBC-53F | 3.0 | | |
| PYG-2-1 | 7.0 | | |
| PGIY-2-04 | 6.0 | | |
| PGIY-2-1 | 6.0 | | |
| Σ | 100.0 | | |

As in Comparative Example 1, the liquid-crystal medium is introduced into a display with TFT addressing. This display is distinguished, in particular, by the fact that it requires a lower addressing voltage and switches faster than that containing the mixture of Comparative Example 1.

As an alternative to the three last-mentioned compounds, it is also advantageously possible to use in each case three homologues of the PYG-n-m, PGIY-n-0m or PGIY-n-m type or combinations thereof.

Comparative Example 2

The liquid-crystal mixture of Example 5 in GB2300642 was prepared. The composition and physical properties of this mixture are shown in the following table.

| Compound/ abbreviation | Concentration/ % by weight | Physical properties | |
|---|---|---|---|
| D-302FF | 9.0 | T (N, I) = | 75.0° C. |
| D-402FF | 9.0 | $n_e$ (20° C., 589 nm) = | 1.6209 |
| D-502FF | 9.0 | $\Delta n$ (20° C., 589 nm) = | 0.1281 |
| PCH-301 | 16.0 | $\epsilon_\parallel$ (20° C., 1 kHz) = | 3.6 |
| PCH-302 | 13.0 | $\Delta\epsilon$ (20° C., 1 kHz) = | -1.9 |
| PCH-304 | 11.0 | $\gamma_1$ (20° C.) = | 152 mPa · s |
| PGIGI-3-Cl | 9.0 | $V_0$ (20° C.) = | 3.06 V |
| PGIGI-5-Cl | 9.0 | | |
| CBC-33F | 5.0 | | |
| CBC-53F | 5.0 | | |
| CBC-55F | 5.0 | | |
| Σ | 100.0 | | |

As in Comparative Example 1, the liquid-crystal medium is introduced into a display with TFT addressing. This display has a relatively high addressing voltage and comparatively long response times.

Example 2

A liquid-crystal mixture having a similar composition to that of Comparative Example 1 was prepared. This mixture comprises the same compounds in the same concentrations as the comparative example. The only change is the use of the fluorinated terphenyls of the formula I according to the present application instead of the laterally fluorinated terphenyls with terminal polar substituents of the comparative mixture. The composition and physical properties of this mixture are shown in the following table.

| Compound/ abbreviation | Concentration/ % by weight | Physical properties | |
|---|---|---|---|
| D-302FF | 9.0 | T (N, I) = | 76.5° C. |
| D-402FF | 9.0 | $n_e$ (20° C., 589 nm) = | 1.6336 |
| D-502FF | 9.0 | $\Delta n$ (20° C., 589 nm) = | 0.1294 |
| PCH-301 | 16.0 | $\epsilon_\parallel$ (20° C., 1 kHz) = | 3.5 |
| PCH-302 | 13.0 | $\Delta\epsilon$ (20° C., 1 kHz) = | −2.5 |
| PCH-304 | 11.0 | $\gamma_1$ (20° C.) = | 134 mPa · s |
| PGIY-2-1 | 9.0 | $V_0$ (20° C.) = | 2.81 V |
| PGIY-3-1 | 9.0 | | |
| CBC-33F | 5.0 | | |
| CBC-53F | 5.0 | | |
| CBC-55F | 5.0 | | |
| Σ | 100.0 | | |

As in Comparative Example 1, the liquid-crystal medium is introduced into a display with TFT addressing. This display is distinguished, in particular, by the fact that it requires a lower addressing voltage and switches faster than that containing the mixture of Comparative Example 2.

Example 3

A liquid-crystal mixture having a similar clearing point and similar birefringence as in Example 2 was prepared. As in Example 2, terphenyl compounds of the formula I according to the present application were again used, but this time completely different co-components. This mixture composition is preferred in accordance with the present application over that of Example 2. The composition and physical properties of this mixture are shown in the following table.

| Compound/ abbreviation | Concentration/ % by weight | Physical properties | |
|---|---|---|---|
| PCH-502FF | 5.0 | T (N, I) = | 74.5° C. |
| PCH-504FF | 10.0 | $n_e$ (20° C., 589 nm) = | 1.6165 |
| PY-5-04 | 5.0 | $\Delta n$ (20° C., 589 nm) = | 0.1292 |
| CC-3-V1 | 12.0 | $\epsilon_\parallel$ (20° C., 1 kHz) = | 3.4 |
| CC-5-V | 12.0 | $\Delta\epsilon$ (20° C., 1 kHz) = | −2.9 |
| PCH-53 | 7.0 | $\gamma_1$ (20° C.) = | 108 mPa · s |
| PP-1-2V1 | 7.0 | $V_0$ (20° C.) = | 2.35 V |
| BCH-32 | 5.0 | | |
| CPY-2-02 | 11.0 | | |
| CPY-3-02 | 12.0 | | |
| PGIY-2-1 | 7.0 | | |
| PGIY-3-1 | 7.0 | | |
| Σ | 100.0 | | |

As in Comparative Example 1, the liquid-crystal medium is introduced into a display with TFT addressing. This display is distinguished, in particular, by the fact that it requires an even lower addressing voltage and switches even faster than that containing the mixture of Example 2.

Comparative Example 3

The liquid-crystal mixture of Example 6 in GB2300642 was prepared. The composition and physical properties of this mixture are shown in the following table.

| Compound/ abbreviation | Concentration/ % by weight | Physical properties | |
|---|---|---|---|
| PY-3-02 | 15.0 | T (N, I) = | 87.6° C. |
| PY-3-04 | 18.0 | $n_e$ (20° C., 589 nm) = | 1.7255 |
| PGIGI-3-Cl | 10.0 | $\Delta n$ (20° C., 589 nm) = | 0.2116 |
| PGIGI-5-Cl | 15.0 | | |
| D-402FF | 4.0 | $\Delta\epsilon$ (20° C., 1 kHz) = | −2.6 |
| T-2.F3 | 11.0 | $\gamma_1$ (20° C.) = | 172 mPa · s |
| CBC-33F | 3.0 | $V_0$ (20° C.) = | 2.41 V |
| CBC-53F | 3.0 | | |
| CBC-55F | 3.0 | | |
| PYP-2-3 | 15.0 | | |
| Σ | 100.0 | | |

As in Comparative Example 1, the liquid-crystal medium is introduced into a VA display with TFT addressing.

Example 4

A liquid-crystal mixture having a similar composition to that of Comparative Example 3 was prepared. The main change consists in the use of the fluorinated terphenyls of the formula I according to the present application instead of the laterally fluorinated terphenyls with terminal polar substituents of the comparative mixture. The composition and physical properties of this mixture are shown in the following table.

| Compound/ abbreviation | Concentration/ % by weight | Physical properties | |
|---|---|---|---|
| PY-3-02 | 8.0 | T (N, I) = | 88.0° C. |
| PY-5-02 | 8.0 | $n_e$ (20° C., 589 nm) = | 1.7080 |
| PGIGI-3-F | 8.0 | $\Delta n$ (20° C., 589 nm) = | 0.2050 |
| PP-1-2V | 4.0 | | |
| PP-1-2V1 | 6.0 | $\Delta\epsilon$ (20° C., 1 kHz) = | −3.2 |
| BCH-32 | 6.0 | $\gamma_1$ (20° C.) = | 147 mPa · s |
| CPY-2-02 | 9.0 | $V_0$ (20° C.) = | 2.30 V |
| CPY-3-02 | 9.0 | | |
| PYP-2-3 | 10.0 | | |
| PGIY-2-1 | 8.0 | | |
| PGIY-3-1 | 8.0 | | |
| PGIY-2-04 | 8.0 | | |
| PGIY-3-04 | 8.0 | | |
| Σ | 100.0 | | |

As in Comparative Example 1, the liquid-crystal medium is introduced into a VA display with TFT addressing. This display is distinguished, in particular, by the fact that it requires a lower addressing voltage and switches faster than that containing the mixture of Comparative Example 3. However, the birefringence of the mixture is not in the most preferred range according to the present application, but instead is significantly higher and thus requires the use of cells having particularly thin layers.

Comparative Example 4

The liquid-crystal mixture of Example 10 in EP 1 146 104 was prepared. The composition and physical properties of this mixture are shown in the following table.

| Compound/ abbreviation | Concentration/ % by weight | Physical properties | |
|---|---|---|---|
| PCH-304FF | 18.0 | T (N, I) = | 80.5° C. |
| PCH-502FF | 10.0 | $n_e$ (20° C., 589 nm) = | 1.6073 |
| PCH-504FF | 15.0 | $\Delta n$ (20° C., 589 nm) = | 0.1192 |
| CCP-302FF | 10.0 | $\epsilon_\parallel$ (20° C., 1 kHz) = | 4.0 |
| BCH-32 | 8.0 | $\Delta\epsilon$ (20° C., 1 kHz) = | −5.1 |
| CCP-V-1 | 10.0 | $\gamma_1$ (20° C.) = | 225 mPa · s |
| PCH-302 | 3.0 | $t_{store}$ (−40° C.) > | 1000 h |
| PGIGI-3-F | 2.0 | $V_0$ (20° C.) = | 1.84 V |
| CPY-2-02 | 12.0 | | |
| CPY-3-02 | 12.0 | | |
| Σ | 100.0 | | |

As in Comparative Example 1, the liquid-crystal medium is introduced into a display with TFT addressing. This display has comparatively long response times.

Example 5

A liquid-crystal mixture having a similar composition to that of Comparative Example 4 was prepared. This mixture comprises virtually the same compounds in virtually the same concentrations as that of the comparative example. The main change is the use of the fluorinated terphenyls of the formula I according to the present application. The clearing point, the birefringence and the dielectric anisotropy of the mixture of this example were set to the corresponding values of Comparative Example 4. The composition and physical properties of this mixture are shown in the following table.

| Compound/ abbreviation | Concentration/ % by weight | Physical properties | |
|---|---|---|---|
| PCH-304FF | 15.0 | T (N, I) = | 80.5° C. |
| PCH-502FF | 10.0 | $n_e$ (20° C., 589 nm) = | 1.6079 |
| PCH-504FF | 15.0 | $\Delta n$ (20° C., 589 nm) = | 0.1195 |
| PGIY-2-04 | 5.0 | $\epsilon_\parallel$ (20° C., 1 kHz) = | 3.9 |
| PGIY-3-04 | 5.0 | $\Delta\epsilon$ (20° C., 1 kHz) = | −4.9 |
| CCP-V-1 | 5.0 | $\gamma_1$ (20° C.) = | 201 mPa · s |
| CCP-V2-1 | 8.0 | $t_{store}$ (−40° C.) > | 1000 h |
| CC-3-V1 | 11.0 | $V_0$ (20° C.) = | 1.82 V |
| CH-33 | 2.0 | | |
| CPY-2-02 | 12.0 | | |
| CPY-3-02 | 12.0 | | |
| Σ | 100.0 | | |

As in Comparative Example 1, the liquid-crystal medium is introduced into a VA display with TFT addressing. This display is distinguished, in particular, by the fact that it switches significantly faster at the same addressing voltage than that containing the mixture of Comparative Example 4.

Comparative Example 5

The liquid-crystal mixture of Example 2 in EP 1 146 104 was prepared. The composition and physical properties of this mixture are shown in the following table.

| Compound/ abbreviation | Concentration/ % by weight | Physical properties | |
|---|---|---|---|
| PCH-304FF | 19.0 | T (N, I) = | 71.0° C. |
| PCH-504FF | 20.0 | $n_e$ (20° C., 589 nm) = | 1.5829 |

-continued

| Compound/ abbreviation | Concentration/ % by weight | Physical properties | |
|---|---|---|---|
| CCP-302FF | 6.0 | $\Delta n$ (20° C., 589 nm) = | 0.1020 |
| BCH-32 | 7.0 | $\epsilon_\parallel$ (20° C., 1 kHz) = | 3.7 |
| CCH-35 | 5.0 | $\Delta\epsilon$ (20° C., 1 kHz) = | −3.9 |
| CC-3-V1 | 8.0 | $\gamma_1$ (20° C.) = | 142 mPa · s |
| CC-5-V | 11.0 | $t_{store}$ (−40° C.) > | 400 h |
| CPY-2-02 | 12.0 | VHR (5 min, 100° C.) = | 90% |
| CPY-2-02 | 12.0 | $V_0$ (20° C.) = | 1.92 V |
| Σ | 100.0 | | |

As in Comparative Example 1, the liquid-crystal medium is introduced into a display with TFT addressing. This display has a high addressing voltage and relatively long response times.

Example 6

A liquid-crystal mixture having a similar composition to that of Comparative Example 5 was prepared. This mixture comprises virtually the same compounds in virtually the same concentrations as that of the comparative example. The main change is the use of the fluorinated terphenyls of the formula I according to the present application. The clearing point, the birefringence and the dielectric anisotropy of the mixture of this example were set to the corresponding values of Comparative Example 5. The composition and physical properties of this mixture are shown in the following table.

| Compound/ abbreviation | Concentration/ % by weight | Physical properties | |
|---|---|---|---|
| PCH-304FF | 10.0 | T (N, I) = | 70.5° C. |
| PCH-502FF | 12.0 | $n_e$ (20° C., 589 nm) = | 1.5883 |
| PCH-504FF | 18.0 | $\Delta n$ (20° C., 589 nm) = | 0.1025 |
| CCP-302FF | 4.0 | $\epsilon_\parallel$ (20° C., 1 kHz) = | 3.7 |
| PGIY-2-1 | 7.0 | $\Delta\epsilon$ (20° C., 1 kHz) = | −3.9 |
| CCH-34 | 8.0 | $\gamma_1$ (20° C.) = | 136 mPa · s |
| CCH-35 | 6.0 | $t_{store}$ (−40° C.) > | 1000 h |
| CC-3-V1 | 10.0 | VHR (5 min, 100° C.) = | 92% |
| CCP-V2-1 | 6.0 | $V_0$ (20° C.) = | 1.89 V |
| CPY-2-02 | 9.0 | | |
| CPY-3-02 | 10.0 | | |
| Σ | 100.0 | | |

As in Comparative Example 1, the liquid-crystal medium is introduced into a VA display with TFT addressing. This display is distinguished, in particular, by the fact that it switches faster than that containing the mixture of Comparative Example 5.

Example 7

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 20.0 | T (N, I) = | 75.5° C. |
| PCH-502FF | 8.0 | $n_e$ (20° C., 589 nm) = | 1.6072 |

-continued

| Compound/ abbreviation | Concentration/ % by weight | Physical properties | |
|---|---|---|---|
| PCH-504FF | 6.0 | $\Delta n$ (20° C., 589 nm) = | 0.1192 |
| BCH-32 | 8.0 | $\epsilon_\parallel$ (20° C., 1 kHz) = | 3.7 |
| CCP-V-1 | 4.0 | $\Delta \epsilon$ (20° C., 1 kHz) = | -3.6 |
| CC-3-V1 | 8.0 | $\gamma_1$ (20° C.) = | 142 mPa · s |
| CC-5-V | 8.0 | $k_1$ (20° C.) = | 14.2 pN |
| CCH-35 | 5.0 | $k_1/k_3$ (20° C.) = | 0.98 |
| CPY-2-02 | 12.0 | $t_{store}$ (-30° C.) > | 1000 h |
| CPY-3-02 | 11.0 | $t_{store}$ (-40° C.) > | 400 h |
| PYP-2-3 | 10.0 | VHR (5 min, 100° C.) = | 90% |
| Σ | 100.0 | $V_0$ (20° C.) = | 2.09 V |

As in Comparative Example 1, the liquid-crystal medium is introduced into a VA display with TFT addressing. This display is distinguished, in particular, by the fact that it switches quickly.

Example 8

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 17.0 | T (N, I) = | 70.3° C. |
| PCH-502FF | 8.0 | $n_e$ (20° C., 589 nm) = | 1.5933 |
| PCH-504FF | 8.0 | $\Delta n$ (20° C., 589 nm) = | 0.1093 |
| CCP-V2-1 | 6.0 | $\epsilon_\parallel$ (20° C., 1 kHz) = | 3.7 |
| CC-3-V1 | 8.0 | $\Delta \epsilon$ (20° C., 1 kHz) = | -3.5 |
| CC-5-V | 20.0 | $\gamma_1$ (20° C.) = | 118 mPa · s |
| CPY-2-02 | 11.0 | $k_1$ (20° C.) = | 13.0 pN |
| CPY-3-02 | 12.0 | $k_1/k_3$ (20° C.) = | 1.03 |
| PYP-2-3 | 10.0 | $t_{store}$ (-30° C.) > | 1000 h |
| Σ | 100.0 | $t_{store}$ (-40° C.) > | 500 h |
| | | VHR (5 min, 100° C.) = | 91% |
| | | $V_0$ (20° C.) = | 2.07 V |

As in Comparative Example 1, the liquid-crystal medium is introduced into a VA display with TFT addressing. This display is distinguished, in particular, by the fact that it switches very quickly.

Example 9

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 18.0 | T (N, I) = | 78.0° C. |
| PCH-502FF | 8.0 | $n_e$ (20° C., 589 nm) = | 1.6484 |
| PCH-504FF | 4.0 | $\Delta n$ (20° C., 589 nm) = | 0.1517 |
| BCH-32 | 8.0 | $\epsilon_\parallel$ (20° C., 1 kHz) = | 4.0 |
| PGIGI-3-F | 8.0 | $\Delta \epsilon$ (20° C., 1 kHz) = | -3.9 |
| CC-3-V | 10.0 | $\gamma_1$ (20° C.) = | 202 mPa · s |
| CPY-2-02 | 12.0 | $k_1$ (20° C.) = | 13.3 pN |
| CPY-3-02 | 12.0 | $k_1/k_3$ (20° C.) = | 1.14 |
| PYP-2-3 | 10.0 | $t_{store}$ (-40° C.) > | 1000 h |
| PYP-3-3 | 10.0 | $V_0$ (20° C.) = | 2.07 V |
| Σ | 100.0 | | |

As in Comparative Example 1, the liquid-crystal medium is introduced into a VA display with TFT addressing. This display is distinguished, in particular, by the fact that it switches quickly.

Example 10

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 7.0 | T (N, I) = | 81.0° C. |
| PCH-502FF | 7.0 | $n_e$ (20° C., 589 nm) = | 1.6017 |
| PCH-504FF | 19.0 | $\Delta n$ (20° C., 589 nm) = | 0.1176 |
| CCP-302FF | 11.0 | $\epsilon_\parallel$ (20° C., 1 kHz) = | 4.0 |
| CCP-31FF | 5.0 | $\Delta \epsilon$ (20° C., 1 kHz) = | -4.9 |
| CC-3-V | 9.0 | $\gamma_1$ (20° C.) = | 192 mPa · s |
| CC-5-V | 3.0 | $k_1$ (20° C.) = | 15.6 pN |
| CCH-35 | 5.0 | $k_1/k_3$ (20° C.) = | 1.00 |
| CPY-2-02 | 12.0 | $t_{store}$ (-40° C.) > | 1000 h |
| CPY-3-02 | 12.0 | VHR (5 min, 100° C.) = | 85% |
| PYP-2-3 | 5.0 | $V_0$ (20° C.) = | 1.89 V |
| PYP-3-3 | 5.0 | | |
| Σ | 100.0 | | |

As in Comparative Example 1, the liquid-crystal medium is introduced into a VA display with TFT addressing. This display is distinguished, in particular, by the fact that it requires a relatively low addressing voltage and switches relatively quickly.

Example 11

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 10.0 | T (N, I) = | 73.0° C. |
| PCH-502FF | 10.0 | $n_e$ (20° C., 589 nm) = | 1.6275 |
| PCH-504FF | 9.0 | $\Delta n$ (20° C., 589 nm) = | 0.1349 |
| BCH-32 | 6.0 | $\epsilon_\parallel$ (20° C., 1 kHz) = | 3.8 |
| PCH-53 | 4.0 | $\Delta \epsilon$ (20° C., 1 kHz) = | -3.6 |
| CC-3-V | 11.0 | $\gamma_1$ (20° C.) = | 156 mPa · s |
| CC-5-V | 5.0 | $k_1$ (20° C.) = | 13.1 pN |
| CPY-2-02 | 13.0 | $k_1/k_3$ (20° C.) = | 1.06 |
| CPY-3-02 | 12.0 | $t_{store}$ (-40° C.) > | 1000 h |
| PYP-2-3 | 10.0 | $V_0$ (20° C.) = | 2.06 V |
| PYP-3-3 | 10.0 | | |
| Σ | 100.0 | | |

As in Comparative Example 1, the liquid-crystal medium is introduced into a VA display with TFT addressing. This display is distinguished, in particular, by the fact that it requires a relatively low addressing voltage and switches comparatively quickly.

Example 12

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 16.0 | T (N, I) = | 68.5° C. |
| PCH-502FF | 8.0 | $n_e$ (20° C., 589 nm) = | 1.6505 |
| BCH-32 | 8.0 | $\Delta n$ (20° C., 589 nm) = | 0.1507 |
| CC-3-V | 10.0 | $\epsilon_\parallel$ (20° C., 1 kHz) = | 4.1 |
| CPY-2-02 | 12.0 | $\Delta\epsilon$ (20° C., 1 kHz) = | −3.8 |
| CPY-3-02 | 12.0 | $\gamma_1$ (20° C.) = | 155 mPa · s |
| PYP-2-3 | 12.0 | $k_1$ (20° C.) = | 13.3 pN |
| PYP-3-3 | 11.0 | $k_1/k_3$ (20° C.) = | 1.12 |
| PY-1-1 | 11.0 | $t_{store}$ (−40° C.) > | 1000 h |
| Σ | 100.0 | $V_0$ (20° C.) = | 1.97 V |

As in Comparative Example 1, the liquid-crystal medium is introduced into a VA display with TFT addressing. This display is distinguished, in particular, by the fact that it requires a relatively low addressing voltage and switches very quickly.

Example 13

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 16.0 | T (N, I) = | 70.5° C. |
| PCH-502FF | 8.0 | $n_e$ (20° C., 589 nm) = | 1.6056 |
| PCH-504FF | 16.0 | $\Delta n$ (20° C., 589 nm) = | 0.1190 |
| BCH-32 | 8.0 | $\epsilon_\parallel$ (20° C., 1 kHz) = | 3.9 |
| CC-3-V1 | 8.0 | $\Delta\epsilon$ (20° C., 1 kHz) = | −4.1 |
| CC-5-V | 10.0 | $\gamma_1$ (20° C.) = | 147 mPa · s |
| CPY-2-02 | 12.0 | $k_1$ (20° C.) = | 13.7 pN |
| CPY-3-02 | 12.0 | $k_1/k_3$ (20° C.) = | 0.91 |
| PPY-5-2 | 10.0 | $t_{store}$ (−40° C.) > | 1000 h |
| Σ | 100.0 | $V_0$ (20° C.) = | 1.85 V |

As in Comparative Example 1, the liquid-crystal medium is introduced into a VA display with TFT addressing. This display is distinguished, in particular, by the fact that it requires a low addressing voltage and switches quickly.

Example 14

A liquid-crystal mixture in accordance with the present application was prepared. The composition and physical properties of this mixture are shown in the following table.

| Compound/ abbreviation | Concentration/ % by weight | Physical properties | |
|---|---|---|---|
| PCH-304FF | 20.0 | T (N, I) = | 75.0° C. |
| PCH-502FF | 8.0 | $n_e$ (20° C., 589 nm) = | 1.6076 |
| PCH-504FF | 6.0 | $\Delta n$ (20° C., 589 nm) = | 0.1202 |
| BCH-32 | 9.0 | $\epsilon_\parallel$ (20° C., 1 kHz) = | 3.8 |
| CC-3-V1 | 8.0 | $\Delta\epsilon$ (20° C., 1 kHz) = | −3.7 |
| CC-5-V | 14.0 | $\gamma_1$ (20° C.) = | 140 mPa · s |
| CPY-2-02 | 12.0 | $k_1$ (20° C.) = | 14.4 pN |
| CPY-3-02 | 12.0 | $k_1/k_3$ (20° C.) = | 0.92 |
| PPY-5-2 | 6.0 | $t_{store}$ (−40° C.) > | 1000 h |
| PPY-5-5 | 5.0 | $V_0$ (20° C.) = | 2.01 V |
| Σ | 100.0 | | |

As in Comparative Example 1, the liquid-crystal medium is introduced into a VA display with TFT addressing. This display is distinguished, in particular, by the fact that it requires a relatively low addressing voltage and switches quickly.

Example 15

A liquid-crystal mixture in accordance with a preferred embodiment of the present application was prepared. The composition and physical properties of this mixture are shown in the following table.

| Compound/ abbreviation | Concentration/ % by weight | Physical properties | |
|---|---|---|---|
| PCH-304FF | 16.0 | T (N, I) = | 72.0° C. |
| PCH-502FF | 8.0 | $n_e$ (20° C., 589 nm) = | 1.6017 |
| PCH-504FF | 8.0 | $\Delta n$ (20° C., 589 nm) = | 0.1159 |
| BCH-32 | 8.0 | $\epsilon_\parallel$ (20° C., 1 kHz) = | 3.8 |
| CC-3-V1 | 8.0 | $\Delta\epsilon$ (20° C., 1 kHz) = | −3.8 |
| CC-5-V | 18.0 | $\gamma_1$ (20° C.) = | 133 mPa · s |
| CPY-2-02 | 10.0 | $k_1$ (20° C.) = | 13.1 pN |
| CPY-3-02 | 10.0 | $k_1/k_3$ (20° C.) = | 1.01 |
| PGIY-2-02 | 10.0 | $V_0$ (20° C.) = | 1.98 V |
| PGIY-3-02 | 4.0 | | |
| Σ | 100.0 | | |

As in Comparative Example 1, the liquid-crystal medium is introduced into a VA display with TFT addressing. This display is distinguished, in particular, by the fact that it requires a relatively low addressing voltage and switches very quickly.

Example 16

A liquid-crystal mixture in accordance with the present application having a similar composition to that of Example 15 was prepared. The composition and physical properties of this mixture are shown in the following table.

| Compound/ abbreviation | Concentration/ % by weight | Physical properties | |
|---|---|---|---|
| PCH-304FF | 5.0 | T (N, I) = | 90.0° C. |
| PCH-502FF | 12.0 | $n_e$ (20° C., 589 nm) = | 1.6037 |
| PCH-504FF | 11.0 | $\Delta n$ (20° C., 589 nm) = | 0.1204 |
| CCP-302FF | 8.0 | $\epsilon_\parallel$ (20° C., 1 kHz) = | 4.0 |
| CCP-502FF | 7.0 | $\Delta\epsilon$ (20° C., 1 kHz) = | −5.0 |
| CCH-35 | 6.0 | $\gamma_1$ (20° C.) = | 223 mPa · s |
| CC-3-V1 | 7.0 | $k_1$ (20° C.) = | 15.9 pN |
| CC-5-V | 8.0 | $k_1/k_3$ (20° C.) = | 1.05 |
| PGIGI-3-F | 2.0 | $t_{store}$ (−30° C.) > | 1000 h |
| CPY-2-02 | 12.0 | $t_{store}$ (−40° C.) > | 600 h |

-continued

| Compound/abbreviation | Concentration/% by weight | Physical properties | |
|---|---|---|---|
| CPY-3-02 | 12.0 | VHR (5 min, 100° C.) = | 85% |
| PGIY-2-04 | 5.0 | $V_0$ (20° C.) = | 1.93 V |
| PGIY-3-04 | 5.0 | | |
| Σ | 100.0 | | |

As in Comparative Example 1, the liquid-crystal medium is introduced into a VA display with TFT addressing. This display is distinguished, in particular, by the fact that it can be operated up to high temperatures, requires a relatively low addressing voltage and nevertheless switches relatively quickly.

Example 17

A liquid-crystal mixture in accordance with the present application was prepared. The composition and physical properties of this mixture are shown in the following table.

| Compound/abbreviation | Concentration/% by weight | Physical properties | |
|---|---|---|---|
| PCH-304FF | 13.0 | T (N, I) = | 74.0° C. |
| PCH-502FF | 9.0 | $n_e$ (20° C., 589 nm) = | 1.6051 |
| PCH-504FF | 7.0 | Δn (20° C., 589 nm) = | 0.1175 |
| PCH-53 | 3.0 | $\epsilon_\parallel$ (20° C., 1 kHz) = | 3.7 |
| CCP-V2-1 | 10.0 | Δε (20° C., 1 kHz) = | −3.5 |
| CC-3-V1 | 8.0 | $\gamma_1$ (20° C.) = | 143 mPa · s |
| CC-5-V | 9.0 | $k_1$ (20° C.) = | 13.8 pN |
| CCH-35 | 5.0 | $k_1/k_3$ (20° C.) = | 1.07 |
| CPY-2-02 | 11.0 | $t_{store}$ (−30° C.) > | 1000 h |
| CPY-3-02 | 11.0 | $t_{store}$ (−40° C.) > | 500 h |
| PGIY-2-1 | 7.0 | VHR (5 min, 100° C.) = | 85% |
| PGIY-3-1 | 7.0 | $V_0$ (20° C.) = | 2.16 V |
| Σ | 100.0 | | |

As in Comparative Example 1, the liquid-crystal medium is introduced into a VA display with TFT addressing. This display is distinguished, in particular, by the fact that it requires a relatively low addressing voltage and switches very quickly.

Example 18

A liquid-crystal mixture in accordance with the present application having similar compounds and a similar composition to that of the preceding example (Example 17) was prepared. The composition and physical properties of this mixture are shown in the following table.

| Compound/abbreviation | Concentration/% by weight | Physical properties | |
|---|---|---|---|
| PCH-304FF | 12.0 | T (N, I) = | 68.0° C. |
| PCH-502FF | 12.0 | $n_e$ (20° C., 589 nm) = | 1.5916 |
| PCH-504FF | 12.0 | Δn (20° C., 589 nm) = | 0.1108 |
| CCP-302FF | 10.0 | $\epsilon_\parallel$ (20° C., 1 kHz) = | 3.9 |
| CCH-35 | 5.0 | Δε (20° C., 1 kHz) = | −4.2 |
| CC-3-V1 | 16.0 | $\gamma_1$ (20° C.) = | 144 mPa · s |
| CC-5-V | 5.0 | $k_1$ (20° C.) = | 12.6 pN |
| CPY-2-02 | 7.0 | $k_1/k_3$ (20° C.) = | 1.14 |
| CPY-3-02 | 7.0 | $t_{store}$ (−30° C.) > | 1000 h |
| PGIY-2-1 | 7.0 | $t_{store}$ (−40° C.) > | 400 h |
| PGIY-3-1 | 7.0 | VHR (5 min, 100° C.) = | 82% |
| Σ | 100.0 | $V_0$ (20° C.) = | 1.96 V |

As in Comparative Example 1, the liquid-crystal medium is introduced into a VA display with TFT addressing. This display is distinguished, in particular, by the fact that it requires a lower addressing voltage than that of the preceding example (Example 17) and at the same time switches virtually as quickly as this.

Example 19

Another liquid-crystal mixture in accordance with the present application having similar compounds and a similar composition to that of the two preceding examples (Examples 17 and 18) was prepared. The composition and physical properties of this mixture are shown in the following table.

| Compound/abbreviation | Concentration/% by weight | Physical properties | |
|---|---|---|---|
| PCH-304FF | 7.0 | T (N, I) = | 88.5° C. |
| PCH-502FF | 8.0 | $n_e$ (20° C., 589 nm) = | 1.6035 |
| PCH-504FF | 8.0 | Δn (20° C., 589 nm) = | 0.1193 |
| CCP-302FF | 10.0 | $\epsilon_\parallel$ (20° C., 1 kHz) = | 3.7 |
| CCP-502FF | 4.0 | Δε (20° C., 1 kHz) = | −4.3 |
| CC-3-V1 | 10.0 | $\gamma_1$ (20° C.) = | 189 mPa · s |
| CC-5-V | 11.0 | $k_1$ (20° C.) = | 16.4 pN |
| CCH-35 | 6.0 | $k_1/k_3$ (20° C.) = | 1.05 |
| CPY-2-02 | 12.0 | $t_{store}$ (−30° C.) > | 1000 h |
| CPY-3-02 | 12.0 | $t_{store}$ (−40° C.) > | 300 h |
| PGIY-2-1 | 6.0 | VHR (5 min, 100° C.) = | 85% |
| PGIY-3-1 | 6.0 | $V_0$ (20° C.) = | 2.12 V |
| Σ | 100.0 | | |

As in Comparative Example 1, the liquid-crystal medium is introduced into a VA display with TFT addressing. This display is distinguished, in particular, by the fact that it requires a somewhat lower addressing voltage than that of Example 17 and can be operated up to very high temperatures and at the same time still switches relatively quickly.

Example 20

A further liquid-crystal mixture according to the present application having similar compounds and a similar composition to that of the three preceding examples (Examples 17 to 19) was prepared. The clearing point of the mixture here was raised further, in particular by addition of a compound having four six-membered rings (CBC-33). The composition and physical properties of this mixture are shown in the following table.

| Compound/abbreviation | Concentration/% by weight | Physical properties | |
|---|---|---|---|
| PCH-304FF | 6.0 | T (N, I) = | 91.5° C. |
| PCH-502FF | 10.0 | $n_e$ (20° C., 589 nm) = | 1.6171 |
| PCH-504FF | 9.0 | Δn (20° C., 589 nm) = | 0.1296 |

-continued

| Compound/abbreviation | Concentration/% by weight | Physical properties | |
|---|---|---|---|
| CCP-302FF | 9.0 | $\epsilon_\|$ (20° C., 1 kHz) = | 3.7 |
| BCH-32 | 5.0 | $\Delta\epsilon$ (20° C., 1 kHz) = | −4.1 |
| CC-3-V1 | 9.0 | $\gamma_1$ (20° C.) = | 204 mPa · s |
| CC-5-V | 7.0 | $k_1$ (20° C.) = | 16.6 pN |
| CCH-35 | 6.0 | $k_1/k_3$ (20° C.) = | 1.06 |
| CPY-2-O2 | 11.0 | $t_{store}$ (−30° C.) > | 1000 h |
| CPY-3-O2 | 12.0 | $t_{store}$ (−40° C.) > | 350 h |
| PGIY-2-1 | 7.0 | VHR (5 min, 100° C.) = | 86% |
| PGIY-3-1 | 7.0 | $V_0$ (20° C.) = | 2.20 V |
| CBC-33 | 2.0 | | |
| Σ | 100.0 | | |

As in Comparative Example 1, the liquid-crystal medium is introduced into a VA display with TFT addressing. This display is distinguished, in particular, by the fact that it requires virtually the same addressing voltage as that of Example 17 and can be operated up to even higher temperatures than that of the preceding example (Example 19) and at the same time still switches relatively quickly.

Example 21

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-304FF | 14.0 | T (N, I) = | 73.0° C. |
| PCH-502FF | 8.0 | $n_e$ (20° C., 589 nm) = | 1.6048 |
| PCH-504FF | 10.0 | $\Delta n$ (20° C., 589 nm) = | 0.1184 |
| BCH-32 | 8.0 | $\epsilon_\|$ (20° C., 1 kHz) = | 3.9 |
| CC-3-V1 | 10.0 | $\Delta\epsilon$ (20° C., 1 kHz) = | −3.6 |
| CC-5-V | 16.0 | $\gamma_1$ (20° C.) = | 149 mPa · s |
| CPY-2-O2 | 10.0 | $k_1$ (20° C.) = | 13.2 pN |
| CPY-3-O2 | 10.0 | $k_1/k_3$ (20° C.) = | 1.23 |
| PGY-2-O2 | 7.0 | $t_{store}$ (−30° C.) > | 800 h |
| PGY-3-O2 | 7.0 | $t_{store}$ (−40° C.) > | 350 h |
| Σ | 100.0 | $V_0$ (20° C.) = | 2.02 V |

As in Comparative Example 1, the liquid-crystal medium is introduced into a VA display with TFT addressing. This display is distinguished, in particular, by the fact that it requires a relatively low addressing voltage and switches very quickly.

Example 22

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-502FF | 12.0 | T (N, I) = | 93.0° C. |
| PCH-504FF | 9.0 | $n_e$ (20° C., 589 nm) = | 1.6157 |
| CCP-302FF | 10.0 | $\Delta n$ (20° C., 589 nm) = | 0.1291 |
| CCP-502FF | 9.0 | $\epsilon_\|$ (20° C., 1 kHz) = | 3.7 |
| CC-3-V1 | 7.0 | $\Delta\epsilon$ (20° C., 1 kHz) = | −4.1 |
| CC-5-V | 8.0 | $\gamma_1$ (20° C.) = | 215 mPa · s |
| CCH-35 | 8.0 | $k_1$ (20° C.) = | 17.1 pN |
| CPY-2-O2 | 9.0 | $k_1/k_3$ (20° C.) = | 0.99 |
| CPY-3-O2 | 8.0 | $t_{store}$ (−30° C.) > | 1000 h |
| PYG-2-1 | 10.0 | $t_{store}$ (−40° C.) > | 300 h |
| PYG-3-1 | 10.0 | VHR (5 min, 100° C.) = | 83% |
| Σ | 100.0 | $V_0$ (20° C.) = | 2.15 V |

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 23

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-304FF | 19.0 | T (N, I) = | 80.0° C. |
| PCH-504FF | 13.0 | $n_e$ (20° C., 589 nm) = | 1.6574 |
| CPY-2-O2 | 11.0 | $\Delta n$ (20° C., 589 nm) = | 0.1585 |
| CPY-3-O2 | 8.0 | $\epsilon_\|$ (20° C., 1 kHz) = | 3.9 |
| BCH-32 | 10.0 | $\Delta\epsilon$ (20° C., 1 kHz) = | −3.9 |
| CC-3-V1 | 5.0 | $\gamma_1$ (20° C.) = | 232 mPa · s |
| PYP-2-3 | 16.0 | $k_1$ (20° C.) = | 13.5 pN |
| PYP-2-4 | 18.0 | $k_1/k_3$ (20° C.) = | 1.04 |
| Σ | 100.0 | $V_0$ (20° C.) = | 1.99 V |

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 24

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-304FF | 15.0 | T (N, I) = | 70.0° C. |
| PCH-502FF | 14.0 | $n_e$ (20° C., 589 nm) = | 1.6072 |
| CPY-2-O2 | 12.0 | $\Delta n$ (20° C., 589 nm) = | 0.1187 |
| CPY-3-O2 | 12.0 | $\epsilon_\|$ (20° C., 1 kHz) = | 3.8 |
| BCH-32 | 10.0 | $\Delta\epsilon$ (20° C., 1 kHz) = | −3.5 |
| CCH-301 | 12.0 | $\gamma_1$ (20° C.) = | 139 mPa · s |
| CCH-303 | 6.0 | $k_1$ (20° C.) = | 12.4 pN |

-continued

| Compound/abbreviation | Concentration/% by weight | Physical properties | |
|---|---|---|---|
| CCH-35 | 6.0 | $k_1/k_3$ (20° C.) = | 0.99 |
| PYP-2-3 | 6.0 | $V_0$ (20° C.) = | 1.97 V |
| PYP-2-4 | 7.0 | | |
| Σ | 100.0 | | |

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 25

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-502FF | 12.0 | T(N,I) = | 80.5° C. |
| PCH-302FF | 11.0 | $n_e$(20° C., 589 nm) = | 1.6142 |
| CCP-303FF | 5.0 | Δn (20° C., 589 nm) = | 0.1271 |
| CPY-2-O2 | 12.0 | $\epsilon_\parallel$ (20° C., 1 kHz) = | 3.6 |
| CPY-3-O2 | 12.0 | Δε (20° C., 1 kHz) = | −3.6 |
| CC-5-V | 15.0 | $\gamma_1$ (20° C.) = | 145 mPa · s |
| CC-3-V1 | 13.0 | $k_1$ (20° C.) = | 14.4 pN |
| PYP-2-3 | 10.0 | $k_1/k_3$ (20° C.) = | 1.01 |
| PYP-2-4 | 10.0 | $V_0$ (20° C.) = | 2.14 V |
| Σ | 100.0 | | |

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 26

0.80%, based on the total weight of the doped mixture, of the chiral dopant S-4011 was added to the liquid-crystal mixture of Example 25. The resultant chiral mixture had a clearing point of 80.5° C. and a cholesteric pitch of −12.1 μm at 20° C.

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 27

0.85%, based on the total weight of the doped mixture, of the chiral dopant S-2011 was added to the liquid-crystal mixture of Example 25. The resultant chiral mixture had a clearing point of 80.5° C. and a cholesteric pitch of −11.6 μm at 20° C.

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 28

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-304FF | 17.0 | T(N,I) = | 81.5° C. |
| PCH-502FF | 13.0 | $n_e$(20° C., 589 nm) = | 1.6161 |
| CPY-2-O2 | 12.0 | Δn (20° C., 589 nm) = | 0.1272 |
| CPY-3-O2 | 12.0 | $\epsilon_\parallel$ (20° C., 1 kHz) = | 3.7 |
| BCH-32 | 3.0 | Δε (20° C., 1 kHz) = | −3.7 |
| CCP-V-1 | 6.0 | $\gamma_1$ (20° C.) = | 149 mPa · s |
| CCH-35 | 6.0 | $k_1$ (20° C.) = | 17.1 pN |
| CC-3-V1 | 7.0 | $k_1/k_3$ (20° C.) = | 0.82 |
| CC-5-V | 8.0 | | |
| PPY-3-2 | 8.0 | | |
| PPY-5-2 | 8.0 | | |
| Σ | 100.0 | | |

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 29

A liquid-crystal mixture according to a further preferred embodiment of the present application was prepared. The composition and physical properties of this mixture are shown in the following table.

| Compound/abbreviation | Concentration/% by weight | Physical properties | |
|---|---|---|---|
| PCH-304FF | 16.0 | T(N,I) = | 81.0 ° C. |
| PCH-502FF | 12.0 | $n_e$(20° C., 589 nm) = | 1.6137 |
| CCP-302FF | 5.0 | Δn (20° C., 589 nm) = | 0.1259 |
| CPY-2-O2 | 12.0 | $\epsilon_\parallel$ (20° C., 1 kHz) = | 3.7 |
| CPY-3-O2 | 12.0 | Δε (20° C., 1 kHz) = | −3.8 |
| BCH-32 | 4.0 | $\gamma_1$ (20° C.) = | 166 mPa · s |
| CCH-35 | 5.0 | $k_1$ (20° C.) = | 14.9 pN |
| CC-3-V1 | 6.0 | $k_1/k_3$ (20° C.) = | 1.01 |
| CC-5-V | 12.0 | | |
| PYP-2-3 | 12.0 | | |
| PYP-3-5 | 4.0 | | |
| Σ | 100.0 | | |

As in Comparative Example 1, the liquid-crystal medium is introduced into a VA display with TFT addressing. This display is distinguished, in particular, by the fact that it can be operated up to very high temperatures and requires a relatively low addressing voltage and nevertheless switches quickly.

Example 30

The mixture of Example 28 is mixed with a chiral dopant as in Example 26 and used in a VA display.

Example 31

The mixture of Example 29 is mixed with a chiral dopant as in Example 26 and used in a VA display.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The preceding examples can be repeated with similar success by substituting the generically or specifically described reactants and/or operating conditions of this invention for those used in the preceding examples.

In the foregoing and in the examples, all temperatures are set forth uncorrected in degrees Celsius and, all parts and percentages are by weight, unless otherwise indicated.

The entire disclosures of all applications, patents and publications, cited herein are incorporated by reference herein.

What is claimed is:

1. A nematic liquid-crystal medium, wherein said medium comprises a) a dielectrically negative liquid-crystalline component, component A, which comprises one or more dielectrically negative compound(s) of the formula I

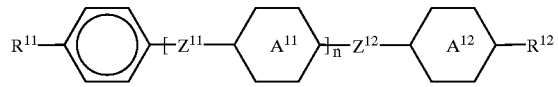

in which $R^{11}$ and $R^{12}$ are each, independently of one another, alkyl having from 1 to 7 carbon atoms, alkoxy having from 1 to 7 carbon atoms or alkoxyalkyl, alkenyl or alkenyloxy having from 2 to 7 carbon atoms, one of

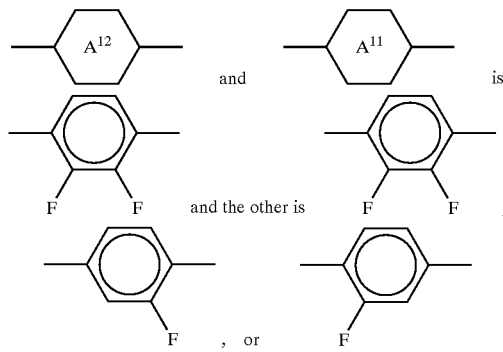

$Z^{11}$ and $Z^{12}$ are each, independently of one another, —CH$_2$—CH$_2$—, —CH$_2$—CF$_2$—, —CF$_2$—CH$_2$—, —OCH$_2$—, —CH$_2$O—, —OCF$_2$—, —CF$_2$O— or a single bond, and n is 1, where one or more H atoms in the third phenyl ring may optionally be replaced by F atoms if

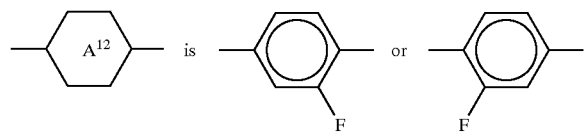

and b) a further dielectrically negative liquid-crystalline component, component B, which is different from component A.

2. A liquid-crystal medium, wherein component B comprises one or more compounds selected from the group consisting of the compounds of the formulae II and III

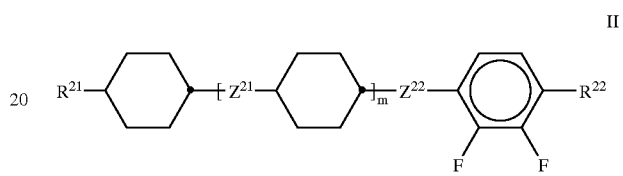

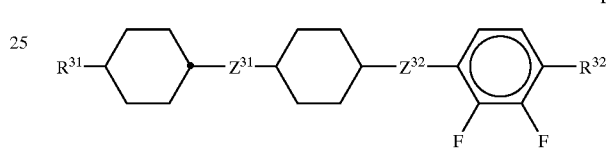

in which $R^{21}$, $R^{22}$, $R^{31}$ and $R^{32}$ are each, independently of one another, alkyl or alkoxy having from 1 to 7 carbon atoms or alkoxyalkyl, alkenyl or alkenyloxy having from 2 to 7 carbon atoms, $Z^{21}$, $Z^{22}$, $Z^{31}$ and $Z^{32}$ are each, independently of one another, —CH$_2$—CH$_2$—, —CH=CH—, —C≡C—, —COO— or a single bond, m is 0 or 1, and

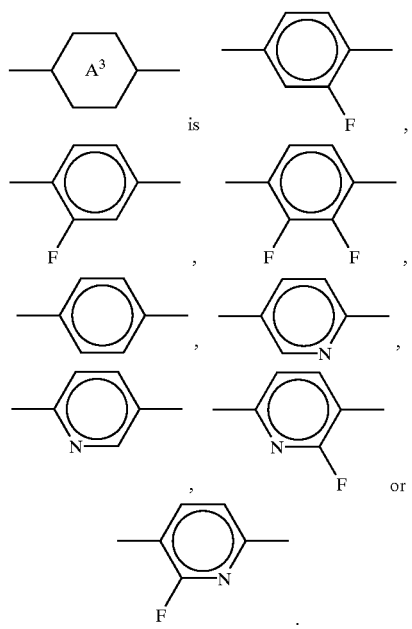

3. A liquid-crystal medium according to claim 1, wherein component B comprises one or more compounds selected from formula II

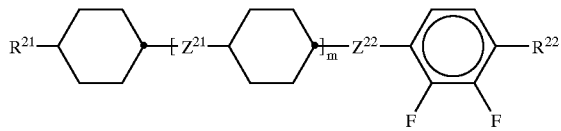

in which

R$^{21}$ and R$^{22}$ are each, independently of one another, alkyl or alkoxy having from 1 to 7 carbon atoms or alkoxyalkyl, alkenyl or alkenyloxy having from 2 to 7 carbon atoms, Z$^{21}$ and Z$^{22}$ are each, independently of one another, —CH$_2$—CH$_2$—, —CH=CH—, —C≡C—, —COO— or a single bond, and m is 0 or 1.

4. The liquid-crystal medium according to claim 1, wherein component B comprises one or more compounds selected from formula III

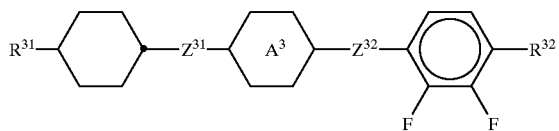

in which

R$^{31}$ and R$^{32}$ are each, independently of one another, alkyl or alkoxy having from 1 to 7 carbon atoms or alkoxyalkyl, alkenyl or alkenyloxy having from 2 to 7 carbon atoms, Z$^{31}$ and Z$^{32}$ are each, independently of one another, —CH$_2$—CH$_2$—, —CH=CH—, —C≡C—, —COO— or a single bond, and

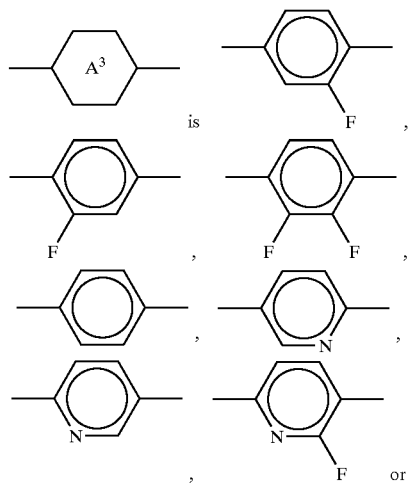

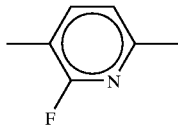

5. A liquid-crystal medium according to claim 1, wherein said medium further comprises a dielectrically neutral liquid-crystalline component, component C.

6. A liquid-crystal medium according to claim 1, wherein said medium further comprises a dielectrically neutral liquid-crystalline component, component C, of formula IV

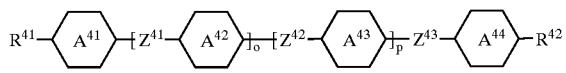

in which

R$^{41}$ and R$^{42}$ are each, independently of one another alkyl having from 1 to 7 carbon atoms, alkoxy having from 1 to 7 carbon atoms, or alkoxyalkyl, alkenyl or alkenyloxy having from 2 to 7 carbon atoms, Z$^{41}$, Z$^{42}$ and Z$^{43}$ are each, independently of one another, —CH$_2$—CH$_2$—, —CH=CH—, —COO— or a single bond,

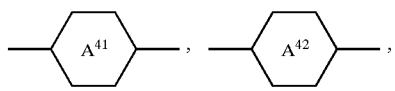

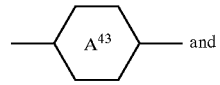 and

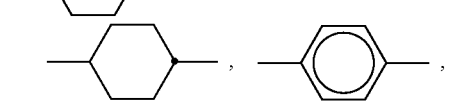 are each, independently of one another,

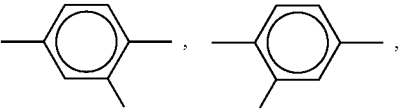

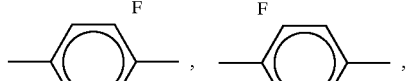

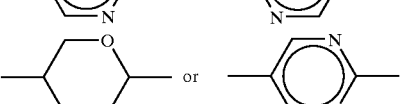

and o and p, are each, independently of one another, 0 or 1.

7. A liquid-crystal medium according to claim 1, wherein said medium further comprises a dielectrically positive liquid-crystalline component, component D.

8. A liquid-crystal medium according to claim 1, wherein said medium further comprises a dielectrically positive liquid-crystalline component, component D, of formula V

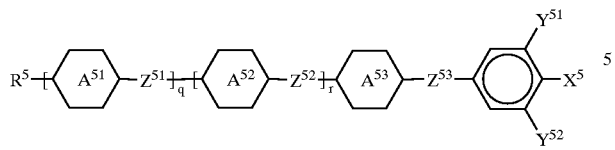

V in which
- $R^5$ is alkyl or alkoxy having from 1 to 7 carbon atoms, or alkoxyalkyl, alkenyl or alkenyloxy having from 2 to 7 carbon atoms,
- $Z^{51}$, $Z^{52}$ and $Z^{53}$ are each, independently of one another, —CH$_2$—CH$_2$—, —CH=CH—, —C≡C—, —COO— or a single bond,

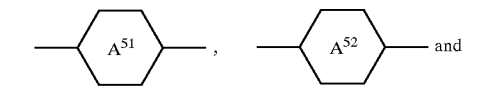

are each, independently of one another,

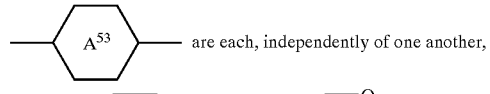

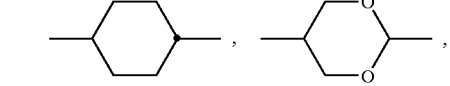

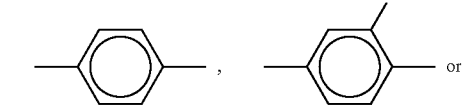

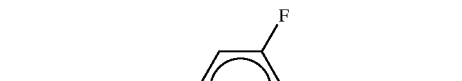

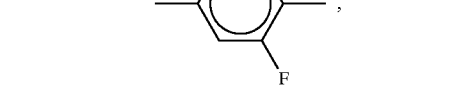

- $X^5$ is F, OCF$_2$H or OCF$_3$,
- $Y^{51}$ and $Y^{52}$ are each, independently of one another, H or F, and
- q and r are each, independently of one another, 0 or 1.

9. The liquid-crystal medium of claim 2 further comprising a dielectrically neutral liquid-crystalline component, component C.

10. The liquid-crystal medium of claim 2 further comprising a dielectrically positive liquid-crystalline component, component D.

11. A liquid-crystal medium according to claim 1, wherein said medium comprises one or more compounds of formula VI

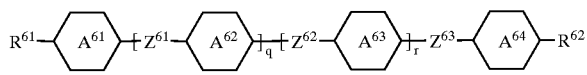

VI in which
- $R^{61}$ and $R^{62}$ are each, independently of one another, alkyl having from 1 to 7 carbon atoms, alkoxy having from 1 to 7 carbon atoms, or alkoxyalkyl, alkenyl or alkenyloxy having from 2 to 7 carbon atoms,
- $Z^{61}$, $Z^{62}$ and $Z^{63}$ are each, independently of one another, —CH$_2$—CH$_2$—, —CH=CH—, —COO— or a single bond,
- at least one of the

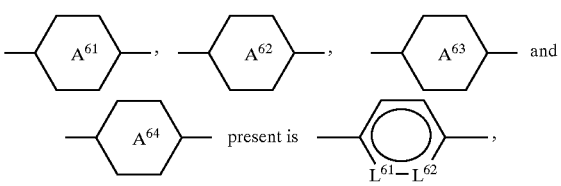

in which at least one of $L^{61}$ and $L^{62}$ is N and the other is N or C—F, and the other

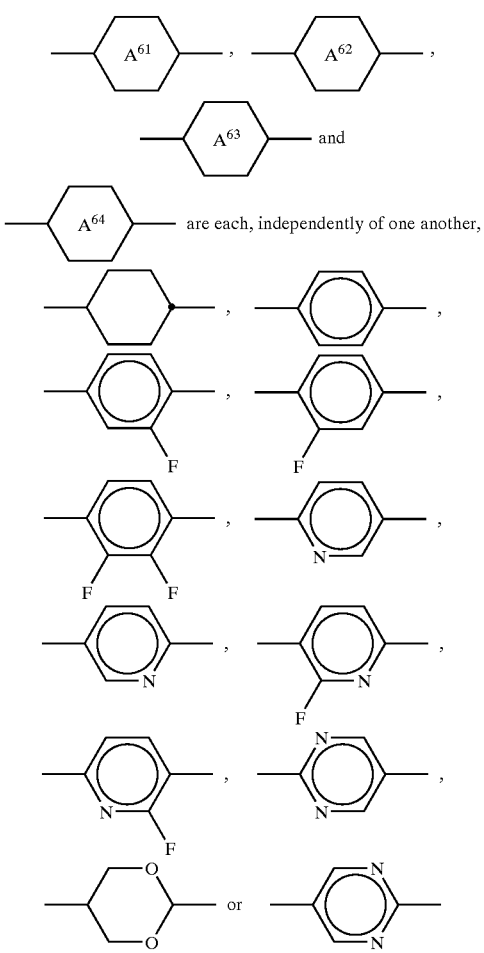

and
- q and r are each, independently of one another, 0 or 1.

12. A liquid-crystal medium according to claim 1, wherein said medium comprises one or more compounds of formula VII

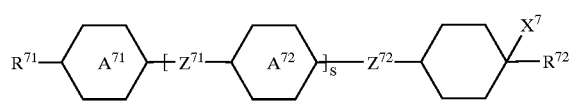

VI in which
- $R^{71}$ and $R^{72}$ are each, independently of one another, alkyl having from 1 to 7 carbon atoms, alkoxy having from 1 to 7 carbon atoms, or alkenyloxy having from 2 to 7 carbon atoms, and $X^7$ is F, Cl, CN or NCS,

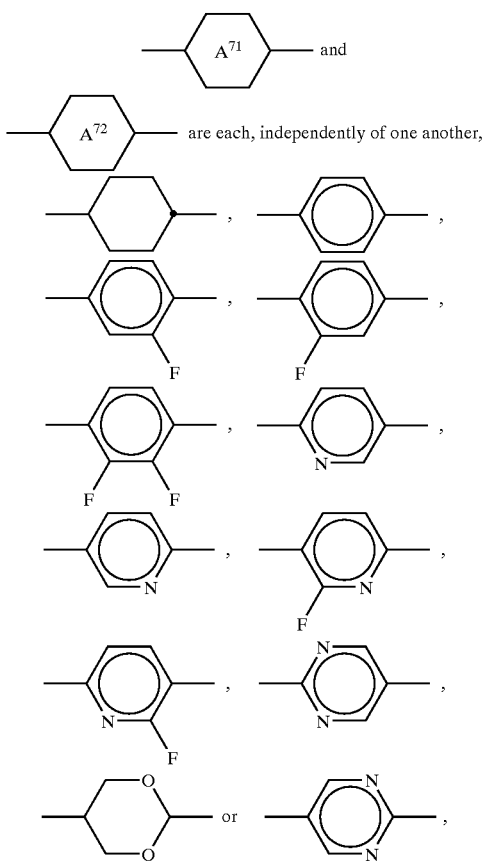

and s is 0 or 1.

13. In an electro-optical display containing a liquid-crystal medium, the improvement wherein said medium is one according to claim 1.

14. A display according to claim 13, wherein said display is an active matrix display.

15. A display of claim 14, wherein said display is an ECB or IPS display.

16. In a method of generating an electro-optical effect using an electro-optical display, the improvement wherein said display is one according to claim 13.

17. A liquid-crystal medium according to claim 6, wherein $R^{41}$ and $R^{42}$ are each, independently of one another n-alkyl having from 1 to 7 carbon atoms, n-alkoxy having from 1 to 7 carbon atoms, or alkoxyalkyl, alkenyl or alkenyloxy having from 2 to 4 carbon atoms.

18. A liquid-crystal medium according to claim 8, wherein $Y^{51}$ is F.

19. A liquid-crystal medium according to claim 8, wherein $Y^{51}$ and $Y^{52}$ are each F.

20. A liquid-crystal medium according to claim 8, wherein $X^5$ is F or $OCF_2H$, and $Y^{52}$ is F.

21. A liquid-crystal medium according to claim 11, wherein $R^{61}$ and $R^{62}$ are each, independently of one another n-alkyl having from 1 to 7 carbon atoms, n-alkoxy having from 1 to 7 carbon atoms, or alkoxyalkyl, alkenyl or alkenyloxy having from 2 to 4 carbon atoms.

22. A liquid-crystal medium according to claim 12, wherein $R^{71}$ and $R^{72}$ are each, independently of one another n-alkyl having from 1 to 7 carbon atoms, n-alkoxy having from 1 to 7 carbon atoms, or alkoxyalkyl, alkenyl or alkenyloxy having from 2 to 4 carbon atoms.

23. A liquid-crystal medium according to claim 12, wherein $X^7$ is F or CN.

24. A liquid-crystal medium according to claim 12, wherein

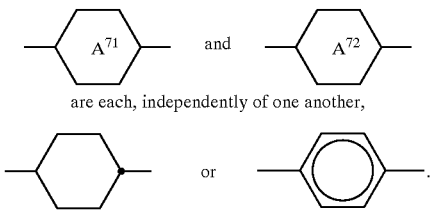

are each, independently of one another,

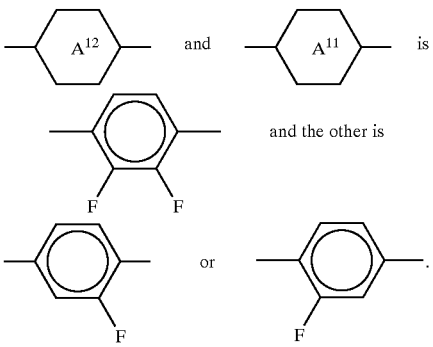

25. A liquid-crystal medium according to claim 1, wherein

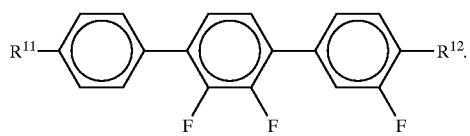

26. A liquid-crystal medium according to claim 1, wherein said component A contains one or more compounds of formula I-2c

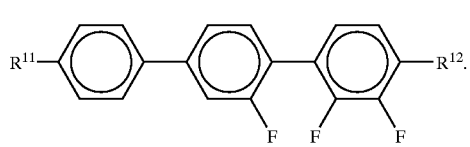

27. A liquid-crystal medium according to claim 1, wherein said component A contains one or more compounds of formula I-3b.

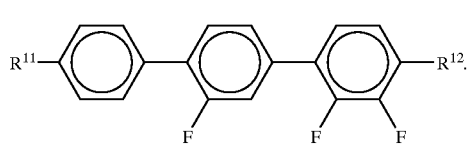

28. A liquid-crystal medium according to claim 1, wherein said component A contains one or more compounds of formula I-3c 29. A liquid-crystal medium according to claim 1, wherein said medium contains from 5% to 85% by weight of compounds of the formula I.

30. A liquid-crystal medium according to claim 2, wherein said medium contains from 5% to 85% by weight of compounds of the formulae II and III.

31. A liquid-crystal medium according to claim 6, wherein said medium contains up to 50% by weight of compounds of the formula IV.

32. A liquid-crystal medium according to claim 8, wherein said medium contains up to 40% by weight of compounds of the formula V.

33. A liquid-crystal medium according to claim 2, wherein said medium further comprises:

a dielectrically neutral liquid-crystalline component, component C, of formula IV

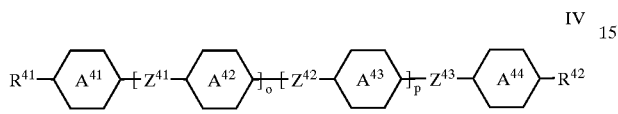

IV in which

R$^{41}$ and R$^{42}$ are each, independently of one another alkyl having from 1 to 7 carbon atoms, alkoxy having from 1 to 7 carbon atoms or alkoxyalkyl, alkenyl or alkenyloxy having from 2 to 7 carbon atoms, Z$^{41}$, Z$^{42}$ and Z$^{43}$ are each, independently of one another, —CH$_2$—CH$_2$—, —CH=CH—, —COO— or a single bond,

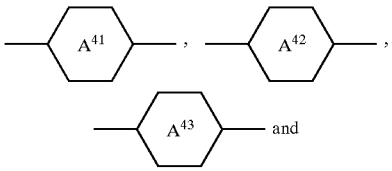

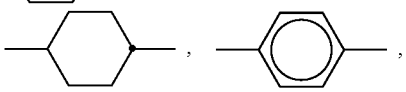

are each, independently of one another,

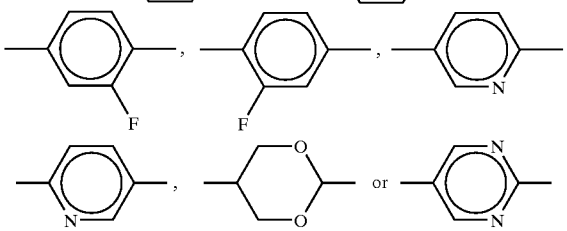

and o and p, are each, independently of one another, 0 or 1; and a dielectrically positive liquid-crystalline component, component D, of formula V

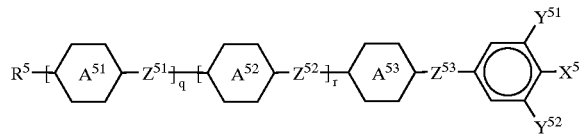

V in which

R$^5$ is alkyl or alkoxy having from 1 to 7 carbon atoms, or alkoxyalkyl, alkenyl or alkenyloxy having from 2 to 7 carbon atoms, Z$^{51}$, Z$^{52}$ and Z$^{53}$ are each, independently of one another, —CH$_2$—CH$_2$—, —CH=CH—, —C≡C—, —COO— or a single bond,

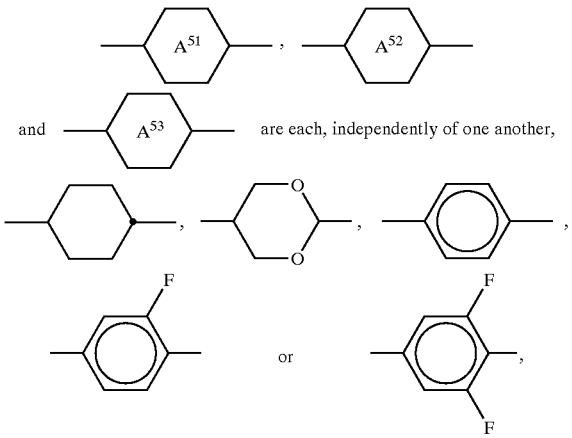

X$^5$ is F, OCF$_2$H or OCF$_3$,

Y$^{51}$ and Y$^{52}$ are each, independently of one another, H or F, and q and r are each, independently of one another, 0 or 1.

34. A liquid-crystal medium according to claim 33, wherein said medium contains from 10% to 35% by weight of compounds of the formula I, from 50% to 90% by weight of compounds of the formulae II and III, from 0% to 40% by weight of compounds of the formula IV, and from 0% to 20% by weight of compounds of the formula V.

35. A liquid-crystal medium according to claim 33, wherein said medium contains from 15% to 30% by weight of compounds of the formula I, from 60% to 80% by weight of compounds of the formulae II and III, from 0% to 20% by weight of compounds of the formula IV and from 0% to 5% by weight of compounds of the formula V.

* * * * *

UNITED STATES PATENT AND TRADEMARK OFFICE
CERTIFICATE OF CORRECTION

PATENT NO. : 6,896,939 B2
DATED : May 24, 2005
INVENTOR(S) : Melanie Klasen-Memmer It is certified that error appears in the above-identified patent and that said Letters Patent is hereby corrected as shown below:

Column 62,
Line 26, delete " [formula with $R^{31}$—⬡—$Z^{31}$—⬡—$Z^{32}$—⬡(O)—$R^{32}$ with F, F substituents] " and insert -- [formula with $R^{31}$—⬡—$Z^{31}$—$A^3$—$Z^{32}$—⬡(O)—$R^{32}$ with F, F substituents] --.

Column 65,
Line 16, delete "–$CH_2$ -" and insert -- –$CH_2$ -, --.

Column 68,
Line 19, at the beginning, insert -- one of --.

Column 70,
Line 16, delete "-CH=CH-" and insert -- -C≡C- --.

Signed and Sealed this

Thirtieth Day of August, 2005

JON W. DUDAS
*Director of the United States Patent and Trademark Office*